United States Patent
Dolph et al.

(10) Patent No.: US 10,481,865 B2
(45) Date of Patent: *Nov. 19, 2019

(54) AUTOMATED VOICE ENABLEMENT OF APPLICATIONS

(71) Applicant: International Business Machines Corporation, Armonk, NY (US)

(72) Inventors: Blaine H. Dolph, Western Springs, IL (US); David M. Lubensky, Brookfield, CT (US); Mal Pattiarachi, New York, NY (US); Marco Pistoia, Amawalk, NY (US); Nitendra Rajput, Gurgaon (IN); Justin Weisz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/790,162

(22) Filed: Oct. 23, 2017

(65) Prior Publication Data

US 2019/0121609 A1    Apr. 25, 2019

(51) Int. Cl.

| G06F 3/048 | (2013.01) |
| G06F 3/16 | (2006.01) |
| G06F 3/0484 | (2013.01) |
| G06F 17/27 | (2006.01) |
| G06F 8/38 | (2018.01) |
| G06F 17/28 | (2006.01) |
| G06F 9/451 | (2018.01) |

(52) U.S. Cl.
CPC .......... *G06F 3/167* (2013.01); *G06F 3/04842* (2013.01); *G06F 8/38* (2013.01); *G06F 9/451* (2018.02); *G06F 17/2765* (2013.01); *G06F 17/2785* (2013.01); *G06F 17/2795* (2013.01); *G06F 17/2881* (2013.01)

(58) Field of Classification Search
CPC ............ G06F 3/0482; G06F 16/24578; G06F 17/2785; G06F 3/04847

See application file for complete search history.

(56) References Cited

U.S. PATENT DOCUMENTS

| 8,352,908 B2 | 1/2013 | Jhoney et al. |
| 9,026,443 B2 | 5/2015 | Lenke |
| 9,081,550 B2 * | 7/2015 | Oz .......................... G06F 3/167 |
| 9,107,083 B1 | 8/2015 | Ledet |

(Continued)

OTHER PUBLICATIONS

Braines et al., Enabling CosIST User:D2D at the Network Edge; Oct. 2014, IEEE, 8 pages.*

(Continued)

*Primary Examiner* — Linh K Pham
(74) *Attorney, Agent, or Firm* — ZIP Group PLLC

(57) ABSTRACT

Techniques are disclosed for generating a voice user interface (VUI) modality within an application that includes graphical user interface (GUI) screens. A GUI screen parser analyzes the GUI screens to determine the various navigational GUI screen paths that are associated with edge objects within multiple GUI screens. Some edge objects are identified as select objects or prompt objects. A natural language processing system generates a select object synonym data structure and a prompt object data structure that may be utilized by a VUI generator to generate VUI data structures that give the application VUI modality.

16 Claims, 18 Drawing Sheets

(56) References Cited

U.S. PATENT DOCUMENTS

| | | | |
|---|---|---|---|
| 9,240,183 B2 | 1/2016 | Sharifi et al. | |
| 9,418,661 B2 | 8/2016 | Fay et al. | |
| 9,601,116 B2 | 3/2017 | Casado et al. | |
| 9,679,562 B2 * | 6/2017 | Burke | G10L 15/22 |
| 9,711,143 B2 | 7/2017 | Kennewick et al. | |
| 10,268,458 B1 * | 4/2019 | Dolph | G06F 8/38 |
| 10,332,518 B2 | 6/2019 | Garg et al. | |
| 2004/0121814 A1 * | 6/2004 | Creamer | H04M 1/72583 |
| | | | 455/563 |
| 2006/0020917 A1 | 1/2006 | Hying et al. | |
| 2008/0065390 A1 * | 3/2008 | Ativanichayaphong | |
| | | | G09B 5/06 |
| | | | 704/270 |
| 2011/0321008 A1 * | 12/2011 | Jhoney | G06F 8/38 |
| | | | 717/114 |
| 2016/0202872 A1 * | 7/2016 | Jang | G06F 3/0346 |
| | | | 715/728 |
| 2016/0336003 A1 * | 11/2016 | Agiomyrgiannakis | |
| | | | G10L 13/033 |
| 2016/0379200 A1 * | 12/2016 | Phillips | G06Q 20/327 |
| | | | 705/17 |
| 2017/0249124 A1 * | 8/2017 | Nakayama | G06F 3/167 |
| 2017/0287222 A1 * | 10/2017 | Fujimaki | G06T 19/006 |
| 2018/0275957 A1 | 9/2018 | Chavali et al. | |

OTHER PUBLICATIONS

Weinstein et al., Static and Dynamic Imaging in Pathology, Aug. 2002, IEEE, 9 pages.*

Tiwari et al., conversation Multi-Modal Browser: An Integrated Multi-Modal Browser and Dialog Manager; 2003; IEEE; 4 pages.*

Anonymously; "Hover-Over Content for User Interfaces"; http://ip.com/IPCOM/000236793D; May 15, 2014.

Anonymously; "Method and apparatus for a synchronous location sensitive text based IVR"; http://ip.com/IPCOM/000244811D; Jan. 18, 2016.

Schaffer, S. et al.; "Modeling input modality choice in mobile graphical and speech interface"; International Journal of Human-Computer Studies, pp. 21-34, 2015.

Perakakis, M. et al.; "A Study in Efficiency and Modality Usage in Multimodal Form Filling Systems"; Dept of Electronics & Computer Engineering, Technical Univ of Crete, Greece, email: prak@telecom.tuc.gr; 2008.

List of IBM Patents or Patent Applications Treated as Related, dated herewith.

* cited by examiner

| Rank | GUI Object ID | GUI Screen ID | # Dependent(s) | # Ancestor(s) | Fork Object? | Flow Path ID(s) | I/O Type |
|---|---|---|---|---|---|---|---|
| 1 | 435 | 431 | 3 | 1 (429), 1 (423) | Yes | 483, 485 | Prompt/Input |
| 2 | 429 | 425 | 4 | NA | No | 483 | Select |
| 3 | 423 | 417 | 4 | NA | No | 485 | Select |
| 4 | 403 | 401 | 2 | NA | No | 479 | Select |
| 5 | 405 | 401 | 1 | 1 | No | 481 | Select |
| 6 | 413 | 411 | 1 | 1 | No | 479 | Output |
| 7 | 427 | 425 | NA | 2 | No | 479 | Output |
| 8 | 421 | 417 | NA | 1 | No | 481 | Output |

AUTOMATED VOICE ENABLEMENT OF APPLICATIONS

BACKGROUND

Embodiments presented herein are related to electronic devices, and more specifically, to automating the creation of a voice user interface (VUI) into a graphical user interface (GUI) of an application.

A GUI, is a type of user interface that allows users to interact with electronic devices through graphical icons, visual indicators, or the like, which are collectively referred to herein as GUI objects. Users may interact with the electronic device through direct manipulation of the GUI objects displayed in the GUI. Beyond computers, GUIs are used in many handheld mobile devices such as smartphones, MP3 players, portable media players, gaming devices, tablets, and smaller household, office and industrial devices.

A voice user interface (VUI) makes user interaction with the electronic device possible by using voice/speech. In general, the more complex the user's speech interactions, the more challenging it is for the VUI to recognize those speech interactions. On the other hand, a VUI may be beneficial for handling quick and routine user interactions with the electronic device.

Some electronic devices, such as mobile electronic devices, are ripe for speech based interfaces due to the typically small display size. In such devices, challenges exist both in providing input (e.g. via small virtual keyboards) and output (e.g. must tap/swipe/pinch to scroll through content). Additionally, speech can provide a hands-free mechanism to interact with the GUI of an application which can be useful for the user.

SUMMARY

In an embodiment of the present invention, a method is presented. The method includes receiving application data of an application that is under development from an application developer computing system and aggregating static images of a graphical user interface of the application (GUI screens) that are contained within the application data. The method further includes analyzing each GUI screen to determine GUI screen navigational flow paths (flow paths) and generating a flow path data structure comprising a list of the flow paths ranked by the number of edge objects comprised within the flow paths and comprising a list of edge objects within the flow paths ranked by the number of dependent edge objects. The method further includes identifying a first edge object within the flow path data structure as a select object, determining a word or phrase associated with the select object from characters that are displayed by the select object with a natural language processing system, and determining synonyms to the word or phrase with the natural language processing system. The method further includes generating a select object synonym data structure comprising the word or phrase and the synonyms to the word or phrase associated with the select object, creating a voice user interface (VUI) select object data structure from the select object synonym data structure, and sending the VUI select object data structure to the application developer computing system to create an application with VUI modality.

In another embodiment of the present invention a computer program product is presented. The computer program product includes a computer readable storage medium having program instructions embodied therewith. The program instructions are readable by a service computing system to cause the service computing system to receive application data of an application that is under development from an application developer computing system and aggregate static images of a graphical user interface of the application (GUI screens) that are contained within the application data. The program instructions further cause service computing system to analyze each GUI screen to determine GUI screen navigational flow paths (flow paths) and generate a flow path data structure comprising a list of the flow paths ranked by the number of edge objects comprised within the flow paths and comprising a list of edge objects within the flow paths ranked by the number of dependent edge objects. The program instructions further cause service computing system to identify a first edge object within the flow path data structure as a select object, determine a word or phrase associated with the select object from characters that are displayed by the select object with a natural language processing system, and determine synonyms to the word or phrase with the natural language processing system. The program instructions further cause service computing system to generate a select object synonym data structure comprising the word or phrase and the synonyms to the word or phrase associated with the select object, create a voice user interface (VUI) select object data structure from the select object synonym data structure, and send the VUI select object data structure to the application developer computing system to create an application with VUI modality.

In another embodiment of the present invention a method is presented. The method includes receiving application data of an application that is under development within an application developer computing system and aggregating static images of a graphical user interface of the application (GUI screens) that are contained within the application data. The method further includes analyzing each GUI screen to determine GUI screen navigational flow paths (flow paths) and generating a flow path data structure comprising a list of the flow paths ranked by the number of edge objects comprised within the flow paths and comprising a list of edge objects within the flow paths ranked by the number of dependent edge objects. The method further includes identifying a first edge object within the flow path data structure as a select object, determining a select word or phrase associated with the select object from characters that are displayed by the select object with a natural language processing system, and determining synonyms to the select word or phrase with the natural language processing system. The method further includes generating a select object synonym data structure comprising the select word or phrase and the synonyms to the select word or phrase associated with the select object, identifying a second edge object within the flow path data structure as a prompt object, and determining a prompt word or phrase associated with the prompt object from characters that are displayed by the prompt object with the natural language processing system. The method further includes generating a prompt object data structure comprising the prompt word or phrase, creating a voice user interface (VUI) select object data structure from the select object synonym data structure and a VUI prompt object data structure from the prompt object data structure, and storing the VUI select object data structure and the VUI prompt object data structure within a VUI portion of the application that is under development to create an application with VUI modality.

BRIEF DESCRIPTION OF THE SEVERAL VIEWS OF THE DRAWINGS

FIG. 6 illustrates an exemplary GUI screen flow map data structure, according to one or more embodiments.

DETAILED DESCRIPTION

Embodiments presented herein disclose techniques for generating a voice user interface (VUI) modality within an application that is under development within an application development computing system. The application includes graphical user interface (GUI) screens. A GUI screen parser analyzes the GUI screens to determine the various navigational GUI screen paths that are associated or defined by edge objects within multiple GUI screens. Some edge objects are identified as select objects or prompt objects. A natural language processing system generates a select object synonym data structure that includes a select word or phrase that is displayed by the select object and synonyms to the select word or phrase. The natural language processing system also generates a prompt object data structure that includes a prompt word or phrase that is displayed by the prompt object. A VUI generator generates VUI data structures from the select object synonym data structure and the prompt object data structure, respectively that give the application VUI modality. Consequently, by adding VUI modality to the application, the functionality of the application is increased and/or the user experience using the application is enhanced.

Figure 1:
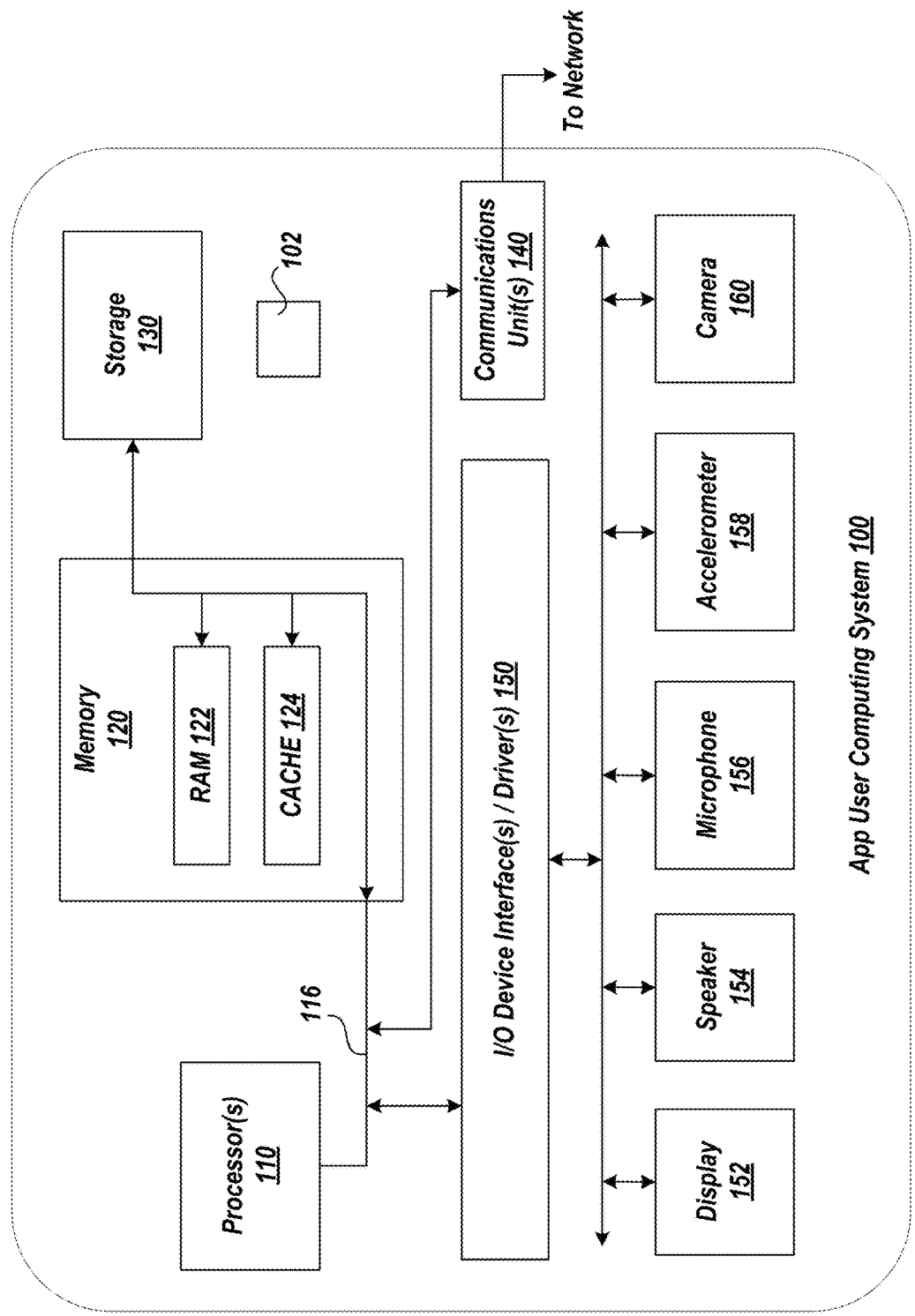
FIG. 1 illustrates an exemplary application user computing system, according to one or more embodiments.

FIG. 1 illustrates an exemplary application user computing system 100. Many modifications to the depicted features of the exemplary application user computing system 100 may be made within the scope of the invention.

Application user computing system 100 is a computer, such as a handheld portable electronic device, and includes a bus 116, which provides communications between at least processor(s) 110, memory 120, persistent storage 130, communications unit 140, and input/output (I/O) interface(s)/driver(s) 150. Memory 120 and persistent storage 130 are examples of a computer readable storage device. A storage device is any piece of hardware that is capable of storing information, such as, data, program code in functional form, and/or other suitable information on a temporary basis and/or permanent basis. Memory 120 may be, for example, one or more random access memories (RAM) 122, cache memory 124, or any other suitable non-volatile or volatile storage device.

An application 102 that includes a GUI is visually presented by display 152 and is stored in persistent storage 130 for execution by one or more of the respective processors 110 via memory 120. In the embodiment illustrated in FIG. 1, persistent storage 130 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

The storage media used by persistent storage 130 may also be removable. For example, a removable hard drive may be used for persistent storage 130. Other examples include an optical or magnetic disk that is inserted into a drive for transfer onto another storage device that is also a part of persistent storage 130, or other removable storage devices such as a thumb drive or smart card.

Communications unit(s) 140 provides for communications with other data processing systems or devices. Communications unit(s) 140 may include one or more network interface cards and may provide communications through the use of either or both physical and wireless communications links. In other embodiments, application user computing system 100 may be devoid of communications unit 410. Application 102 may be downloaded to persistent storage 130 through communications unit(s) 140.

I/O device interface(s)/driver(s) 150 allows for input and output of data with other components within application user computing system 100. For example, I/O device interface(s)/driver(s) 150 may provide a connection to display 152, a speaker 154, microphone 156, accelerometer 158, camera 160, and/or some other suitable input/output device. Display 152 provides a hardware mechanism, such as a screen, to display the GUI to a user and may be, for example, a touch screen, or the like.

Figure 2:
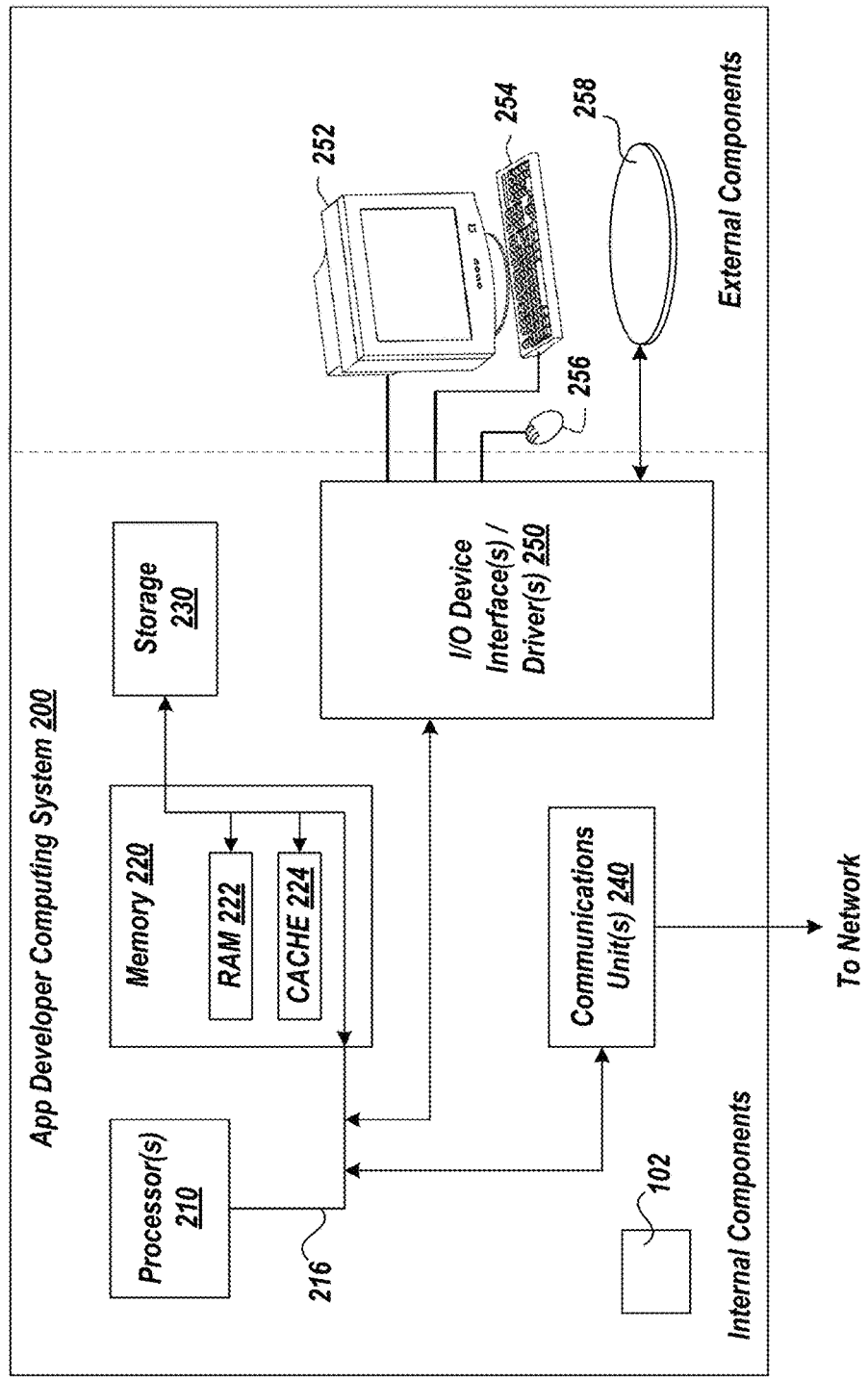
FIG. 2 illustrates an exemplary application developer computing system, according to one or more embodiments.

FIG. 2 illustrates an exemplary application developer computing system 200. Application developer computing system 200 may include respective sets of internal components and external components. Each of the sets of internal components includes bus 216, which provides communications between at least processor(s) 210, memory 220, persistent storage 230, communications unit(s) 240, and input/output (I/O) interface(s)/driver(s) 250. Memory 220 and persistent storage 230 are examples of computer readable storage devices. Memory 220 may be, for example, one or more random access memories (RAM) 222, cache memory 224, or any other suitable non-volatile or volatile storage device.

Application 102 is developed within application developer computing system 200. Persistent storage 230 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

Communications unit(s) 240 provides for communications with other data processing systems or devices. Communications unit(s) 240 may include one or more network interface cards and may provide communications through the use of either or both physical and wireless communications links. Application 102 is developed by application developer computing system 200 and may subsequently be downloaded by application user computing system 100.

I/O device interface(s)/driver(s) 250 allows for input and output of data with other external components connected to application developer computing system 200. For example, I/O device interface(s)/driver(s) 250 may provide a connection to an external display 252, an external keyboard 254, an external mouse 256, an external storage media 258, and/or some other suitable input/output device.

Figure 3:
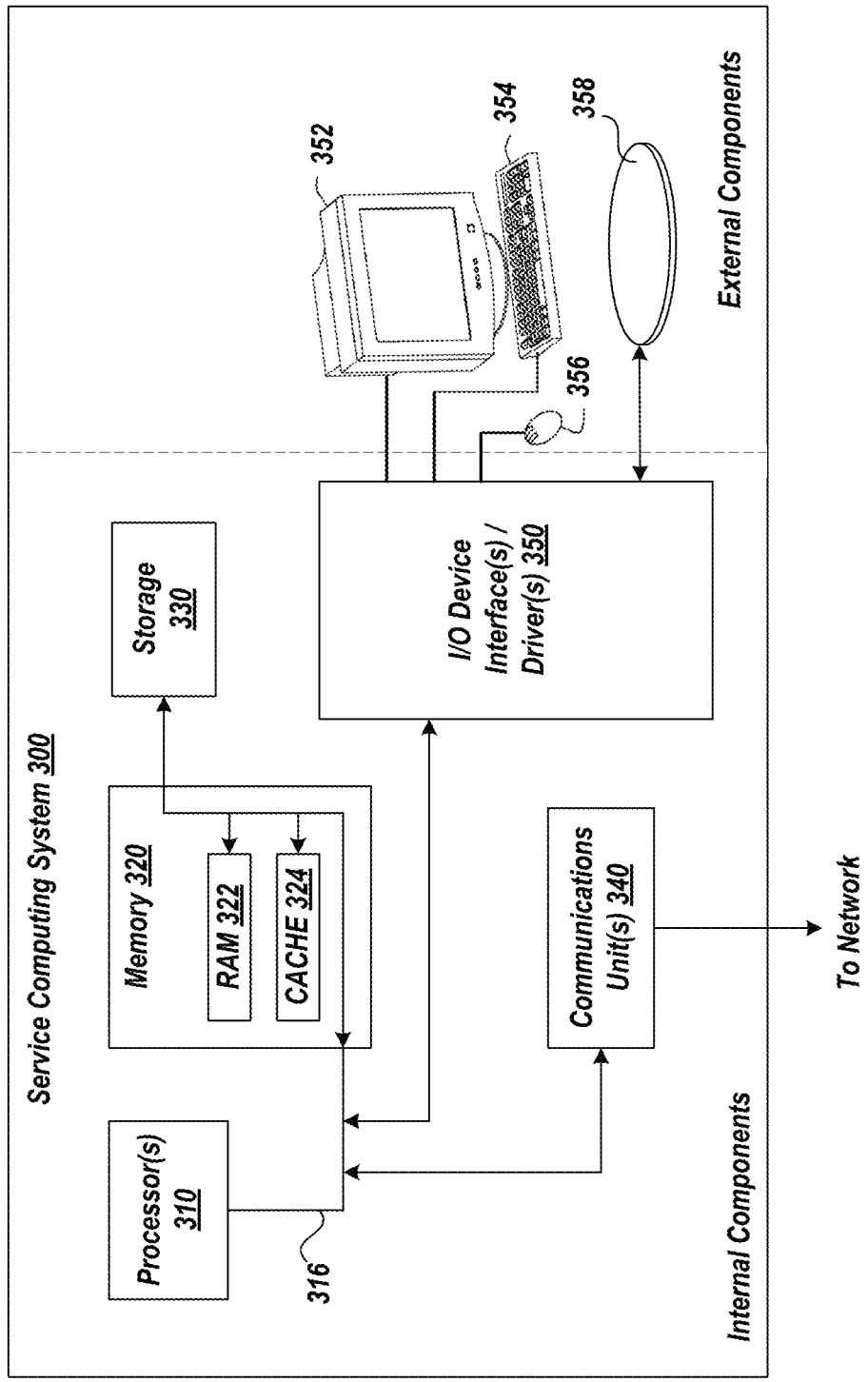
FIG. 3 illustrates an exemplary service computing system, according to one or more embodiments.

FIG. 3 illustrates an exemplary service computing system 300. Service computing system 300 may be utilized in the present embodiments of the invention where a GUI screen parser, a natural language processing system, and VUI generator is utilized as a service by the application developer computing system 200. Service computing system 300 may include respective sets of internal components and external components. Each of the sets of internal components includes bus 316, which provides communications between at least processor(s) 310, memory 320, persistent storage 330, communications unit(s) 340, and input/output (I/O) interface(s)/driver(s) 350. Memory 320 and persistent storage 330 are examples of computer readable storage devices. Memory 320 may be, for example, one or more random access memories (RAM) 322, cache memory 324, or any other suitable non-volatile or volatile storage device.

GUI screens of application 102 may be analyzed within service computing system 300. A VUI output data structure may be generated by service computing system 300 and provided to application developer computing system 200. The VUI output data structure includes data utilized by the application to implement a VUI so that the user of the application may select GUI objects displayed in the GUI utilized speech and/or so that the user of the application may provide a speech input that is processed and utilized as prompt input data associated with a prompt GUI object displayed in the GUI. The VUI may be subsequently added to application 102 during development within application developer computing system 200.

Persistent storage 330 can include one or more of flash memory, magnetic disk storage device of an internal hard drive, a solid state drive, a semiconductor storage device, read-only memory (ROM), EPROM, or any other computer-readable storage device that is capable of storing program instructions or digital information. Communications unit(s) 340 provides for communications with other data processing systems or devices. Communications unit(s) 340 may include one or more network interface cards and may provide communications through the use of either or both physical and wireless communications links.

I/O device interface(s)/driver(s) 350 allows for input and output of data with other external components connected to application developer computing system 300. For example, I/O device interface(s)/driver(s) 350 may provide a connection to an external display 352, an external keyboard 354, an external mouse 356, an external storage media 358, and/or some other suitable input/output device. In some embodiments, service computing system 300 may take the form of a non-user type electronic system, such as a server computer, and may therefore be devoid of external display 352, external keyboard 354, external mouse 356, and the like.

Referring to FIG. 1-FIG. 3, the term "computing system" is used herein for convenience only, and in various embodiments is a more general appropriate data handling system, such as a mobile phone, tablet, server computer, wearable device, etc. In a particular embodiment, computing system 100 is a smart phone, computing system 200 is a client computer such as desk top computer, and computing system 300 is a host computer such as a server.

In particular embodiments, there may be multiple computers that make up computing system 200 Likewise, in particular embodiments, there may be multiple computers that make up computing system 300. In these embodiments, each similar computer is connected to at least one other similar computer via a network. For example, the application 102 may be developed by a team of developers with each developer utilizing his or her own computing system 200. Likewise, GUI screens of the application 102 may be analyzed by numerous computing systems 300.

Each of the computing systems of the embodiments contains one or more general-purpose programmable processor. In some computing systems, the computing system contains multiple processors typical of a relatively large system such as a server computer. Each processor executes instructions stored in the memory and may comprise one or more levels of on-board cache.

The RAM 122, 222, and/or 322 may store or encode data and programs. In an embodiment, the memory 120, 220, and/or 320 represents the entire virtual memory of the applicable computing system, and may also include the virtual memory of other similar type computing systems coupled thereto via the network. The memory 120, 220, and/or 320 may be conceptually a single monolithic entity, but in other embodiments the memory 120, 220, and/or 320 is a more complex arrangement, such as a hierarchy of caches and other memory devices. For example, memory 120, 220, and/or 320 may exist in multiple levels of caches, and these caches may be further divided by function, so that one cache holds instructions while another holds non-instruction data, which are read or otherwise operated upon by the appropriate processor 110, 210, or 310. Memory 120, 220, and/or 320 may be further distributed and associated with different similarly functioning appropriate processors 110, 210, or 310 or sets of appropriate processors 110, 210, or 310, as is known in any of various so-called non-uniform memory access (NUMA) computer architectures.

Memory 120, 220, and/or 320 stores or encodes an operating system and one or more applications. Although the operating system and applications may be viewed as being contained within the appropriate memory 120, 220, and/or 320, in other embodiments some or all of them may be on a different but similarly functioning computer system and may be accessed remotely, e.g., via the network. The computing system 100, 200, and/or 300 may use virtual addressing mechanisms that allow the programs of the computer 100 to behave as if they have access to a large, single storage entity instead of access to multiple, smaller storage entities. Thus, operating system and applications may not be completely contained in the same storage device at the same time. In an embodiment, the operating system and applications each comprise instructions or statements that execute on the one or more processors 110, 210, or 310 and/or instructions or statements that are called by the instructions or statements that execute on the one or more processors 110, 210, or 310 to carry out the functionality described below. When such program instructions are able to be run by the one or more processors 110, 210, or 310, such computing system becomes a particular machine configured to carry out such instructions.

Processors 110, 210, and/or 310 may function as a general-purpose programmable graphics processor unit (GPU) that builds images (e.g. a GUI) for output to a display. The GPU, working in conjunction with one or more applications, determines how to manipulate pixels of display, such as touch screen, to create a display image or user interface. Ultimately, the image (e.g. GUI, etc.) is displayed to a user via the display. The processors 110, 210, and/or 310 and GPU may be discrete components interconnected by one or more busses or may be integrated into a single component.

Although the bus 116, 216, 316 is shown as a relatively simple, single bus structure providing a direct communication path among the processors, memory, and the I/O device interface/driver, in fact the bus 116, 216, and/or 316 may comprise multiple different buses or communication paths, which may be arranged in any of various forms, such as point-to-point links in hierarchical, star or web configurations, multiple hierarchical buses, parallel and redundant paths, or any other appropriate type of configuration.

Communication unit(s) 140, 240, and/or 340 may contain electronic components and logic to adapt or convert data of one protocol to another protocol. Therefore, communication unit(s) 140, 240, and/or 340 may connect a wide variety of devices or other computers to the appropriate computing system 100, 200, and/or 300, such as, but not limited to, servers, computers, bus adapters, PCI adapters, PCIe adapters, NVLink adapters, using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, etc.

The network may be any suitable network or combination of networks and may support any appropriate protocol suitable for communication of data and/or code to/from the various computing systems. In various embodiments, the network may represent a data handling device or a combination of data handling devices, either connected directly or indirectly to the computing systems. For example, computing system 100 may download the application 102 from computing system 300 by the network or from a particular network (e.g., a seller device) that connects the computing system 100 and computing system 200 and computing system 200 may receive the VUI output data structures from computing system 300 directly or from a particular network that connects computing system 200 and computing system 300. For clarity, though one network is referred to, any number of networks (of the same or different types) may be present.

In another embodiment, the network may support wireless communications. In another embodiment, the network may support hard-wired communications, such as a telephone line or cable. In another embodiment, the network may be the Internet and may support IP (Internet Protocol). In another embodiment, the network is implemented as a local area network (LAN) or a wide area network (WAN). In another embodiment, the network is implemented as a hotspot service provider network. In another embodiment, the network is implemented as any appropriate cellular data network, cell-based radio network technology, or wireless network. In another embodiment, the network is implemented as any suitable network or combination of networks.

FIG. 1-FIG. 3 are intended to depict the representative major components of the applicable computing system. The individual components may have greater complexity than represented in the figures, components other than or in addition to those shown the figures may be present, and the number, type, and configuration of such components may vary.

Figure 4:
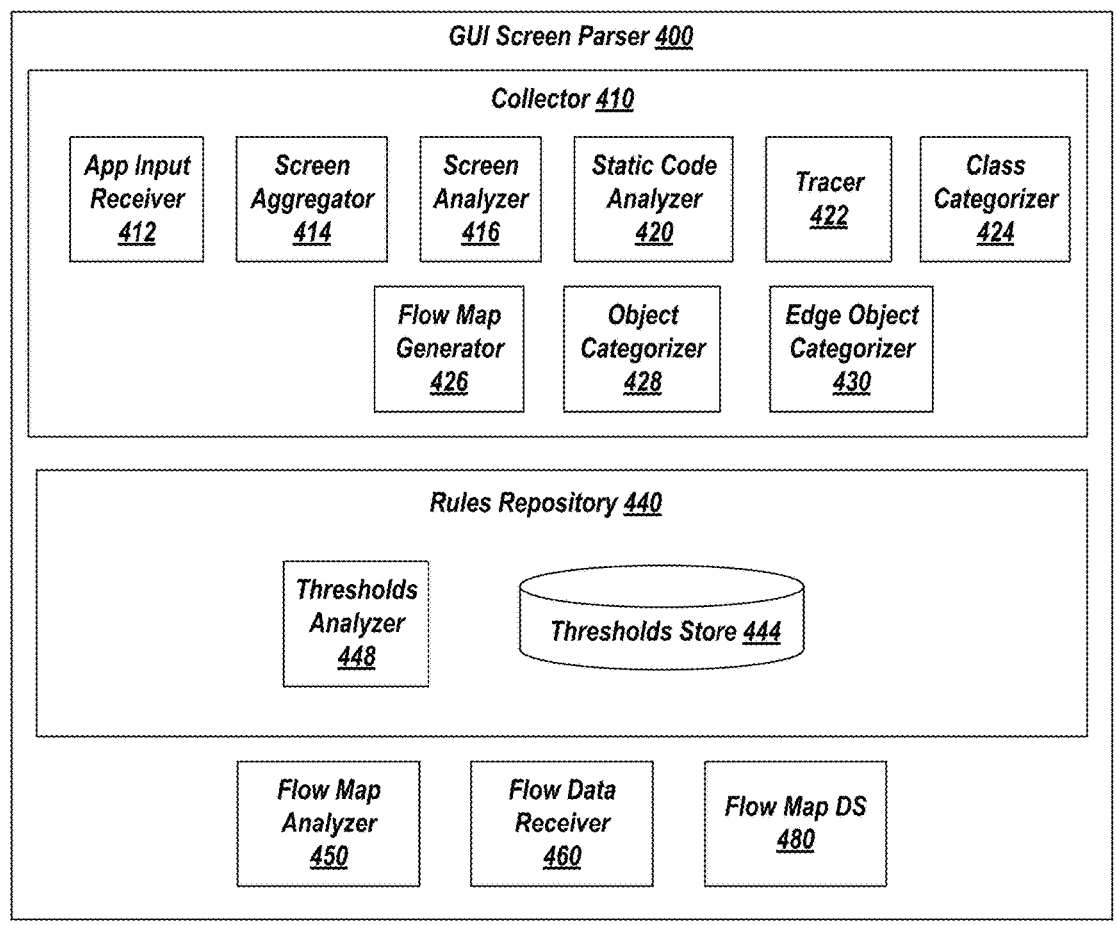
FIG. 4 illustrates an exemplary GUI screen parser, according to one or more embodiments.

FIG. 4 illustrates an exemplary GUI screen parser 400. Parser 400 is module or program instructions stored within computing system 200 or, alternatively, stored within computing system 300. Parser 400 analyzes application 102 input data to determine GUI screens, determine GUI objects within the GUI screens, whether the GUI objects are edge objects, determine a GUI screen flow map based upon the edge objects, and generate a flow map data structure.

Parser 400 may include a collector 410, a rules repository 440, flow map analyzer 450, a flow map data receiver 460, and/or a flow map data structure. The collector 410 generally collects application 102 information and analyzes the collected application 102 information to determine GUI screens, determine GUI objects within the GUI screens, whether the GUI objects are edge objects, determine a GUI screen flow map based upon the edge objects, and generate a flow map data structure. The rules repository 440 establishes and updates rules utilized to generate the GUI screen flow map and/or to generate the flow map data structure 480. Flow map analyzer 450 determines the number of links that exist between GUI edge objects within GUI screen flow paths using information from collector 410 and thresholds store 444. The flow map data receiver 460 receives input data that specified by the user of the computing system that which includes parser 400 to manually create the flow map and/or to manually supplement the flow map created by flow map generator 426. The flow map data structure 480 is the output of parser 400 and may utilized as an input by a natural language processor and/or by a VUI generator as is further described herein.

The collector 410 may include an application input receiver 412, GUI screen aggregator 414, GUI screen analyzer 416, static code analyzer 410, tracer 422, application class categorizer 424, flow map generator 426, GUI object categorizer 428, and/or edge object categorizer 430.

Application input receiver 412 receives input data associated with application 102. For example, input receiver 412 receives the executable file of application 102, receives screen shots of application 102 GUI, receives application 102 code, receives application 102 mockup file(s), receives application 102 storyboard(s), or the like.

GUI screen aggregator 414 identifies GUI screens from the information received by application input receiver 412 and aggregates or otherwise assembles the GUI screens for efficient subsequent analysis. For example, GUI screen aggregator 414 aggregates various GUI screens from the executed application 102, GUI screen aggregator 414 aggregates the screen shots of application 102, GUI screen aggregator 414 aggregates GUI screens from a GUI screen directory within the application 102, GUI screen aggregator 414 aggregates GUI screens from application 102 mockup file(s), GUI screen aggregator 414 aggregates GUI screens from application 102 storyboard(s), or the like.

GUI screen analyzer 416 conducts digital optical object recognition (OOR) techniques upon the aggregated GUI screens to determine which GUI objects are displayed within GUI screens and/or determine whether the GUI objects are edge objects. The GUI screen analyzer 416 may utilize optical character recognition (OCR), or the like, to determine GUI text objects within GUI screens, may utilize optical image recognition (OIR), or the like to determine GUI image objects within GUI screens, etc. Once the GUI screen analyzer 416 determines text GUI objects and image GUI objects, the GUI screen analyzer 416 may conduct post-processing analysis to determine whether any of the determined text GUI objects and image GUI objects are further associated or better associated as audio GUI objects and/or video GUI objects. For example, to determine if a text particular GUI object or a particular image GUI object is associated with or better classified as an audio GUI object, the GUI screen analyzer 416 may identify the existence of predetermined GUI objects that indicate the particular GUI object or the particular image GUI is an audio GUI object. In an implementation, the predetermined GUI objects may be a play GUI object that is known to signify playing of an audio track, a forward GUI object that is known to signify skipping of a portion or an entire audio track, a reverse GUI object that is known to signify returning to a previous portion or a previous audio track. In this implantation if a threshold number of such predetermined GUI objects exist, the GUI screen analyzer 416 may determine that an image GUI object is associated with an audio GUI object. Similar post-processing analysis may be conducted by GUI screen analyzer 416 to determine whether any of the determined text GUI objects and image GUI objects are further associated or better associated as video GUI objects.

Static code analyzer 420 statically scans code or program instructions of application 102 to determine which GUI objects are displayed within GUI screens and/or determine whether the GUI objects are edge objects. Static code analyzer 420 analyzes the code of application 102 without executing the application 102. In an implementation, static code analyzer 420 scans some version of the source code of application 102, and in the other implementations, static code analyzer 420 scans some version of the object code of application 102. In some embodiments, the scan of application 102 may determine the available GUI objects that the application 102 may utilize by scanning a library or directory of application 102 that contains such GUI objects. In various embodiments, static code analyzer 420 may also scan the code of application 102 to determine whether a GUI object is a text GUI object, image GUI object, audio GUI object, or video GUI object. In various embodiments, static code analyzer 420 may also statically scan the code of application 102 to determine the hierarchical relationship(s) of GUI objects within GUI screens. Static code analyzer may also determine whether the identified GUI objects are edge objects. An edge object is a GUI object within a GUI screen that is associated with, directs, or influences what is displayed upon subsequent GUI screens or is a GUI object in a subsequent GUI screen that is dependent upon a prior GUI object. For example, the application 102 may include a particular flow sequence of five GUI screens. A primary edge object exists within the first GUI screen if that edge object begins the navigation flow from the first GUI screen to the subsequent GUI screen. In the next four subsequent GUI screens, other GUI objects are displayed that are dependent upon the primary edge object and are also deemed edge objects. For example, a prompt GUI object is displayed in a first GUI screen that is prompting the user for a numerical value that, once received, begins the navigational flow to subsequent GUI screens that display the numerical value. Here, the prompt GUI object is the primary edge object and the numerical values are dependent edge objects.

Tracer 422 executes the application 102 and simulates user interaction with the GUI of application 102 and/or traces in-memory (e.g. memory 220, 320) activity of the application 102 being executed to determine which GUI objects are displayed within GUI screens and/or determine whether the GUI objects are edge objects.

In the user simulation modality, tracer 422 may sequentially execute the application 102 and iteratively change the simulated user interactions with the GUI of application 102 with each sequential execution to determine the various GUI objects with GUI screens and navigational dependencies thereof; to determine whether a GUI object is a text GUI object, image GUI object, audio GUI object, or video GUI object; to determine the hierarchical relationship(s) of GUI objects within GUI screens; and/or to determine which GUI objects are edge objects.

In the in-memory tracer modality, tracer 422 evokes sequential runs of the application and implements changes to inputs of the application 102 with each sequential execution to determine the various GUI objects with GUI screens and navigational dependencies thereof; to determine whether a GUI object is a text GUI object, image GUI object, audio GUI object, or video GUI object; to determine the hierarchical relationship(s) of GUI objects within GUI screens; and/or to determine which GUI objects are edge objects.

In an embodiment, an output of GUI screen analyzer 416, static code analyzer 420, and tracer 422 may be a GUI screen flow map of various navigation sequences of GUI screens, also referred to as a flow paths, based upon different inputs associated with one or more edges objects within each flow path.

Class categorizer 424 categorizes the class of application 102 based upon the information received by application input receiver 412 and/or based upon the analysis of GUI screen analyzer 416, static code analyzer 420, and/or tracer 422. For example, class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application.

If not otherwise provided by GUI screen analyzer 416, static code analyzer 420, and/or tracer 422, flow map generator 426 may further generate a hierarchical GUI object tree of each GUI object per GUI screen. The object tree may designate an identifier of the GUI screen as a root node and each GUI object within that GUI screen as primary leaf nodes. The object tree may further designate the determined category (e.g., text, image, audio, video, and the like) of each of the GUI objects as a secondary leaf node of the applicable primary leaf node. In an embodiment, the object tree may not only include those GUI objects that are present within the GUI screen within the hierarchical GUI object tree, the object tree may also include all of the available GUI objects that may be included within the GUI screen. For example, if one particular image GUI object is presently included within the GUI screen and it is determined that there are nine other different image GUI objects that could have taken the place of the particular image GUI object, the object tree may include all ten image GUI objects as nodes within the hierarchical GUI object tree.

If not otherwise provided by GUI screen analyzer 416, static code analyzer 420, and/or tracer 422, GUI object categorizer 428 classifies each determined GUI object into a GUI object class. For example, GUI object categorizer 428 determines whether a particular GUI object is a text GUI object, an image GUI object, an audio GUI object, and/or a video GUI object.

If not otherwise provided by GUI screen analyzer 416, static code analyzer 420, and/or tracer 422, edge object categorizer 430 classifies appropriate GUI objects as edge objects. For example, edge object categorizer 430 determines a particular GUI object is an edge object if that GUI object begins, is a part of, or continues a GUI screen navigational flow path. Edge object categorizer 430 determines that a GUI object is an edge object if that GUI object is directly responsible for advancing to a next GUI screen, is directly responsible for rewinding to a previous GUI screen, or directly or indirectly affects what is displayed in subsequent GUI screens.

Flow map generator 426 generates a flow map that consists of GUI screen navigational flow paths of the GUI screens utilizing the information obtained by screen analyzer 416, static code analyzer 420, tracer 422, and/or edge object categorizer 430. A flow path may be created by linking edge objects within a particular GUI screen navigation flow associated with a set of user GUI interactions/inputs or may be established by navigational links or targets (i.e. pointers, or the like) that exist within the GUI code between GUI screens or that exist between GUI objects. A flow map is a data structure that includes all the flow paths of the GUI screens of the application being parsed. In one embodiment, flow map generator 426 supplements the hierarchical GUI object tree by adding designations to edge objects and links between edge objects within each flow path.

Rules repository 440 may include a thresholds store 444 and/or thresholds analyzer 448. Thresholds store 444 stores a rule set or threshold related to how many flow paths should be included within the flow map data structure 480. For example, if there are one hundred different flow paths within an application that contains fifty GUI screens, thresholds store 444 may include a flow path threshold of forty that results in only the longest, shortest, etc., forty of the one hundred flow paths to be included in the flow map data structure 480.

Thresholds analyzer 445 determines the value of the flow path threshold. Thresholds analyzer 445 may determine which class the application 102 is via class categorizer 424 to determine the proper threshold. In another implementation, rules analyzer 445 may utilize input data from computing system 200 to determine the proper threshold. For example, computing system 200 may indicate that parser 400 should identify only the top five percent longest flow paths of GUI screens. Thresholds analyzer 445 may also manage updating of one or more preexisting thresholds within store 444. For example, thresholds analyzer 445 may send a ranked list of flow paths ranked by length, or the like, to a test electronic device. The test electronic device may return to thresholds analyzer 445 a re-ranked list. Thresholds analyzer 445 determines the differences in the ranked list and the re-ranked list and adds or subtracts from the preexisting flow path threshold as appropriate. For example, if the re-ranked list of flow paths add thirty flow paths above the pre-existing threshold, thresholds analyzer 445 decreases the threshold subsequently utilized so that more flow paths would be indicated as being higher than the flow path threshold.

Flow map analyzer 450 links edge objects within each flow path if not previously linked and further analyzes the flow map to determine the length of each flow path, determine the number of dependent GUI objects for each edge object, determines the number of ancestor GUI objects for each edge object, determines whether a single GUI object is contained within multiple flow paths (fork object), gives each flow path a flow path identifier, and indicates the class of each GUI object (e.g., whether the GUI object is a prompt object, a select object, input object, output object, or the like). The Flow map analyzer 450 may total the number of GUI objects within a flow path, total the number of edge objects within a flow path, or the like and may denote the length of that flow path as such total(s).

Flow map analyzer 450 further generates the flow map data structure 480. The output data structure 480 may be organized by ranking flows paths by length or the like, by ranking GUI objects within one or more flow paths based upon the number of dependent edge objects within the flow path, or the like. The output data structure 480 may be a tree, a table, graph, or other type of data structure. The output data structure 480 may further include the indication of the applicable flow path threshold. For example, output data structure 480 may highlight those flow paths or GUI objects that have a flow path length or number of dependent GUI objects higher than the applicable threshold. In an embodiment, the output data structure 480 includes only those flow paths or GUI objects with length or dependent number higher than the applicable threshold.

Flow data receiver 460 receives manual input data from a user of the parser 400 to supplement (if needed) the flow map or the flow map data structure 480. For example, some GUI objects may not be determinable by analyzer 416, and 420, or tracer 422. Such GUI objects may be flagged by flow map generator 426 or flow map analyzer 450 so that the user of parser 400 may denote such GUI objects as text objects, audio objects, prompt objects, select objects, edge objects by flow data receiver 460 receiving such denotations. Flow data receiver 460 may also receive data related to the flow path. For example, the user may link edge objects displayed upon separate GUI screens that were not previously linked by flow map analyzer 450, or the like.

Figure 5:
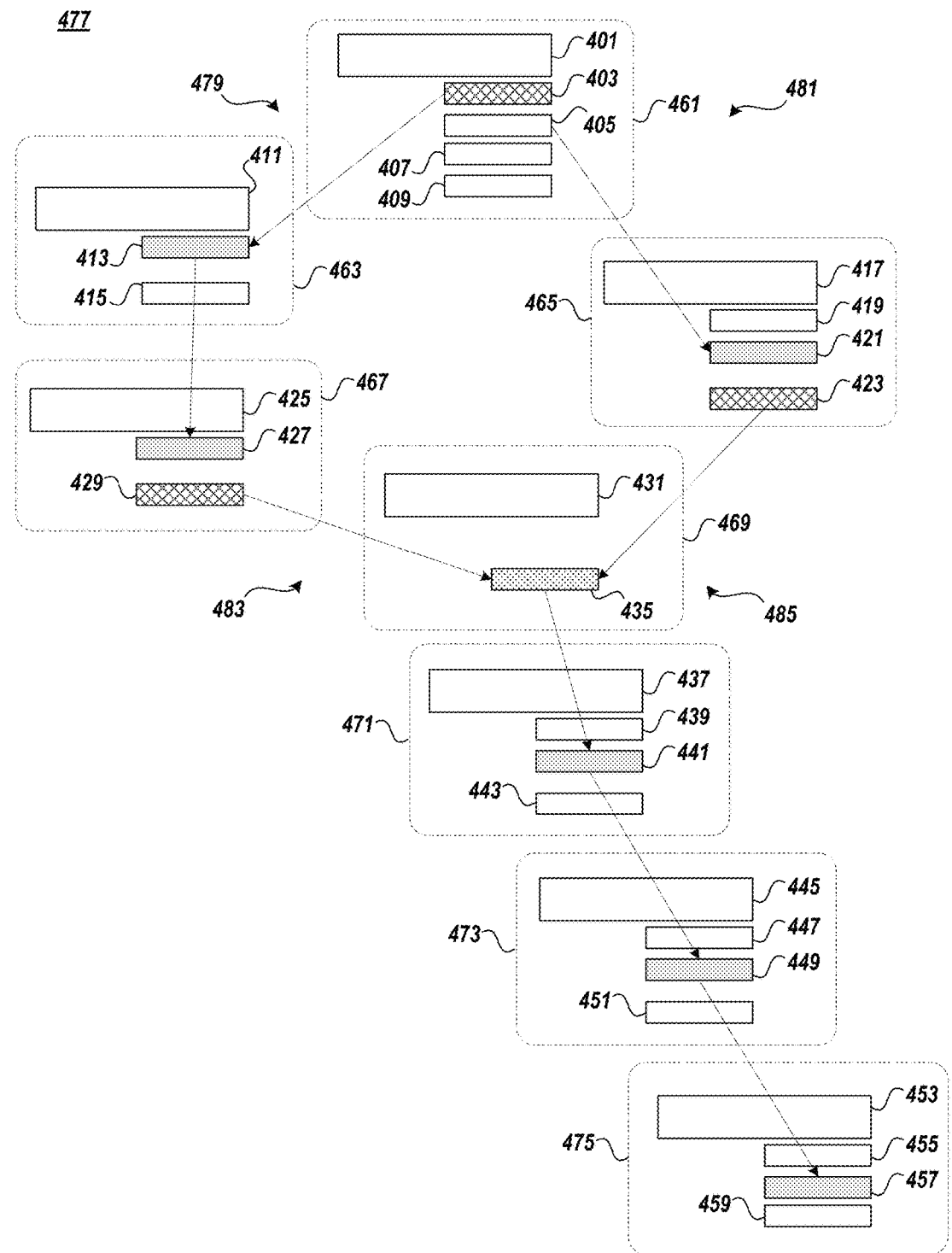
FIG. 5 illustrates an exemplary GUI screen flow map, according to one or more embodiments.

FIG. 5 illustrates an exemplary GUI screen flow map 477, according to one or more embodiments. GUI screen flow map 477 may include GUI screen nodes 461, 463, 465, 467, 469, 471, 472 and 475 with each GUI screen node being associated with a single GUI screen of the application and the GUI objects within the GUI screen. For example, GUI screen node 461 is defined by an identifier of GUI screen 401 and identifiers of GUI objects 403, 405, 407, and 409 that are displayed within the GUI screen 401, GUI screen node 463 is defined by an identifier of GUI screen 411 and identifiers of GUI objects 413 and 415 that are displayed within the GUI screen 411, GUI screen node 465 is defined by an identifier of GUI screen 417 and identifiers of GUI objects 419, 421, and 423 that are displayed within the GUI screen 417, GUI screen node 467 is defined by an identifier of GUI screen 425 and identifiers of GUI objects 427 and 429 that are displayed within the GUI screen 425, GUI screen node 469 is defined by an identifier of GUI screen 431 and identifiers of GUI object 435 that is displayed within the GUI screen 431, GUI screen node 471 is defined by an identifier of GUI screen 437 and identifiers of GUI objects 439, 441, and 443 that are displayed within the GUI screen 437, GUI screen node 473 is defined by an identifier of GUI screen 445 and identifiers of GUI objects 447, 449, and 451 that are displayed within the GUI screen 445, and GUI screen node 475 is defined by an identifier of GUI screen 453 and identifiers of GUI objects 455, 457, and 459 that are displayed within the GUI screen 453. The term GUI object or the like is defined herein to be a display element of the GUI. The GUI object may be an element that displays text, an element that displays an image, and element that shows video, or the like.

GUI object 403, GUI object 405, GUI object 423, and GUI object 429 are select GUI objects, which may also be referred herein as a select object(s). A select object is a GUI object that the user of the application may select or otherwise engage with to implement or change function of the application. For example, a GUI object that displays the text "Go" and that may be selected by the user of the application to begin a particular processes or function is a select object.

GUI object 413, GUI object 421, GUI object 427, GUI object 441, GUI object 449, and GUI object 457 are output GUI objects, which may also be referred to here as output object(s). A select object is not associated with any input from the user of the application but for the selection or manipulation of the select object.

GUI object 435 is a fork GUI object, with may also be referred to herein as a fork object. A fork object is a GUI object this is displayed upon one or more GUI screens and belongs to multiple flow paths. GUI object 435 is also a prompt GUI object, which may also be referred to herein as a prompt object. A prompt object is a GUI object this is displayed upon one or more GUI screens and prompts the user of the application for an input from the user of the application. The prompt object may also be associated with a field entry object for which the user may enter input characters, an input image, input audio, or the like.

GUI object 403 is deemed an edge object by edge object categorizer 430, by flow map generator 426, and/or by flow map analyzer 450 because GUI object 403 is a GUI object within GUI screen 401 that is associated with, directs, or influences what is displayed upon subsequent GUI screens 411, 425. For example, GUI object 403 is selected by a user by interacting with the object 403 in the GUI screen 401 and, upon such interaction, a next GUI screen 411 is displayed with GUI object 413 displayed therein (e.g., of a variety of different options of GUI objects that could be displayed, the particular GUI object 413 is displayed in GUI screen 411 as a result of the user engaging GUI object 403 in GUI screen 401, or the like). Because of such GUI screen navigational display dependency between GUI objects 403 and 413, GUI object 413 is also deemed an edge object by edge object categorizer 430, by flow map generator 426, and/or by flow map analyzer 450. GUI object 427 is similarly deemed an edge object by edge object categorizer 430, by flow map generator 426, and/or by flow map analyzer 450 because of the navigational display dependency between GUI objects 413 and 427. For example, GUI object 403 is selected by a user by interacting with the object 403 in the GUI screen 401 and, upon such interaction, a next GUI screen 411 is displayed with GUI object 413 displayed therein (e.g., of a variety of different options of GUI objects that could be displayed, the particular GUI object 413 is displayed in GUI screen 411 as a result of the user engaging GUI object 403 in GUI screen 401, or the like) and upon a next GUI screen 425 is displayed with GUI object 427 therein (e.g., of a variety of different options of GUI objects that could be displayed, the particular GUI object 427 is displayed in GUI screen 425 as an indirect result of the user engaging GUI object 403 in GUI screen 401 and a direct result of the GUI object 413 being displayed in GUI screen 411). The type of edge object that affects a what GUI object(s) are displayed in a subsequent GUI screen, such as GUI object 403, may be deemed herein a output edge object and conversely, the type of object that is affected by a GUI object within a previous GUI screen, such as GUI objects 413, 427 may be deemed herein a output edge object.

The dependency relationships between GUI objects 403, 413, and 427 establish a particular flow path 479 between GUI screens 401, 411, and 425. For clarity, there may be additional flow paths between GUI screens 401, 411, and 425 associated with different GUI objects displayed within GUI screens 401, 411, and 425 and associated with different user inputs than those GUI objects and user input(s) associated with the exemplary depicted flow path 479.

GUI object 405 is deemed an edge object by edge object categorizer 430, by flow map generator 426, and/or by flow map analyzer 450 because GUI object 405 is a GUI object within GUI screen 401 that is associated with, directs, or influences what is displayed upon subsequent GUI screen 417. For example, GUI object 405 is selected by a user by interacting with the object 405 in the GUI screen 401 and, upon such interaction, a next GUI screen 417 is displayed with GUI object 421 displayed therein (e.g., of a variety of different options of GUI objects that could be displayed, the particular GUI object 421 is displayed in GUI screen 417 as a result of the user engaging GUI object 405 in GUI screen 401, or the like). Because of such GUI screen navigational display dependency between GUI objects 405 and 421, GUI object 421 is also deemed an edge object by edge object categorizer 430, by flow map generator 426, and/or by flow map analyzer 450.

The dependency relationships between GUI objects 405 and 421 establish a particular flow path 481 between GUI screens 401 and 417. For clarity, there may be additional flow paths between GUI screens 401 and 417 associated with different GUI objects displayed within GUI screens 401 and 417 and associated with different user inputs than those GUI objects and user input(s) associated with the exemplary depicted flow path 481.

GUI object 429 is deemed an edge object by edge object categorizer 430, by flow map generator 426, and/or by flow map analyzer 450 because GUI object 429 is a GUI object within GUI screen 425 that is associated with, directs, or influences what is displayed upon subsequent GUI screens 431, 437, 445, and 453. For example, GUI object 429 is selected by a user by interacting with the object 429 in the GUI screen 425 and, upon such interaction, a next GUI screen 431 is displayed with object 435 displayed therein (e.g., of a variety of different options of GUI objects that could be displayed, the particular GUI object 435 is displayed in GUI screen 431 as a result of the user engaging GUI object 403 in GUI screen 401, or the like). GUI objects 441, 449, and 457 are also deemed edge objects due to their dependencies upon upstream or ancestor GUI objects 429 and 435 (similar to GUI objects 413 and 427 being dependent upon GUI object 403 as described above).

The dependency relationships between GUI objects 429, 435, 441, 449, and 457 establish a particular flow path 483 between GUI screens 425, 431, 437, 445, and 453. For clarity, there may be additional flow paths between GUI screens 425, 431, 437, 445, and 453 associated with different GUI objects displayed within GUI screens 425, 431, 437, 445, and 453 and associated with different user inputs than those GUI objects and user input(s) associated with the exemplary depicted flow path 483.

GUI object 423 is deemed an edge object by edge object categorizer 430, by flow map generator 426, and/or by flow map analyzer 450 because GUI object 423 is a GUI object within GUI screen 417 that is associated with, directs, or influences what is displayed upon subsequent GUI screens 431, 437, 445, and 453. For example, GUI object 423 is selected by a user by interacting with the object 423 in the GUI screen 417 and, upon such interaction, a next GUI screen 431 is displayed with object 435 displayed therein (e.g., of a variety of different options of GUI objects that could be displayed, the particular GUI object 435 is displayed in GUI screen 431 as a result of the user engaging GUI object 403 in GUI screen 401, or the like). GUI objects 441, 449, and 457 are also deemed edge objects due to their dependencies upon upstream or ancestor GUI objects 429 and 435 (similar to GUI objects 413 and 427 being dependent upon GUI object 403 as described above).

The dependency relationships between GUI objects 423, 435, 441, 449, and 457 establish a particular flow path 485 between GUI screens 417, 431, 437, 445, and 453. For clarity, there may be additional flow paths between GUI screens 423, 431, 437, 445, and 453 associated with different GUI objects displayed within GUI screens 423, 431, 437, 445, and 453 and associated with different user inputs than those GUI objects and user input(s) associated with the exemplary depicted flow path 485.

Flow map analyzer 450 define the flow path by lining the edge objects and may further analyze the flow map to determine the length of each flow path, determine the number of edge objects within each flow path, determine the number of edge objects that precede each edge object within a flow path, determine the number of subsequent edge objects that follow each edge object within a flow path, determines which GUI objects are fork objects, gives each flow path a flow path identifier, and/or indicate the class of each GUI object (e.g., whether the GUI object is a prompt object, a select object, input object, output object, or the like).

Referring to the exemplary flow map 477, flow map analyzer 450 may determine that the length of flow path 479 is three edge objects 403, 413, and 427, may determine that the length of flow path 481 is two edge objects 405 and 421, may determine that the length of flow path 483 is five edge objects 429, 435, 441, 449, and 457, and determine that the length of flow path 485 is five edge objects 429, 435, 441, 449, and 457. In one implementation, flow map analyzer 450 may rank the flow paths of application by the length of each flow path.

Flow map analyzer 450 may further determine the number of edge objects that precede each edge object within a flow path and determine the number of subsequent edge objects that follow each edge object within a flow path. For example, flow map analyzer 450 may determine that two edge objects (403, 413) precede edge object 427 within flow path 479, and the like. Similarly, flow map analyzer 450 may determine there are two subsequent edge objects (413, 427) that follow edge object 403 within flow path 479.

Flow map analyzer 450 may determine that GUI objects 435 is fork object since GUI object 435 belongs to both flow path 483 and flow path 485. Flow map analyzer 450 may further give each flow path a flow path identifier. For example, flow map analyzer 450 may give flow path 479 a first unique flow path identifier number, may give flow path 481 a second unique flow path identifier number, may give flow path 483 a third unique flow path identifier number, and may give flow path 485 a fourth unique flow path identifier number.

FIG. 6 illustrates an exemplary GUI screen flow map data structure 480, according to one or more embodiments. Flow map analyzer 450 may generate the flow map data structure 480 in tabular form, as depicted, and may include a rank column, a GUI object identifier column, a GUI screen identifier column, number of dependent edge object column, a number of preceding or ancestor edge object column, a fork object designation column, a flow path identifier, a flow path length column (not shown), and GUI object classification column.

Flow map analyzer 450 may prioritize fork objects in the ranking of flow paths and/or edge objects. For example, GUI object 435 is denoted as the highest ranked edge object as it is the only fork object within the flow paths 479, 481, 483, or 485. If additional fork objects were therein included, the multiple fork objects may be ranked based upon the number of dependent or downstream edge objects within the flow path, may be ranked based upon the number of ancestor or upstream edge objects within the flow path, or the like. The remaining edge objects that are not denoted as fork objects may be ranked based upon the number of dependent or downstream edge objects within the flow path (as shown), may be ranked based upon the number of ancestor or upstream edge objects within the flow path, or the like.

For clarity, though GUI screen flow map data structure 480 is exemplary shown in human readable characters and, as such, may be displayed to a user upon a GUI displayed upon system 200, 300, or the like, GUI screen flow map data structure 480 may also include solely machine readable characters, as is known in the art.

Figure 7:
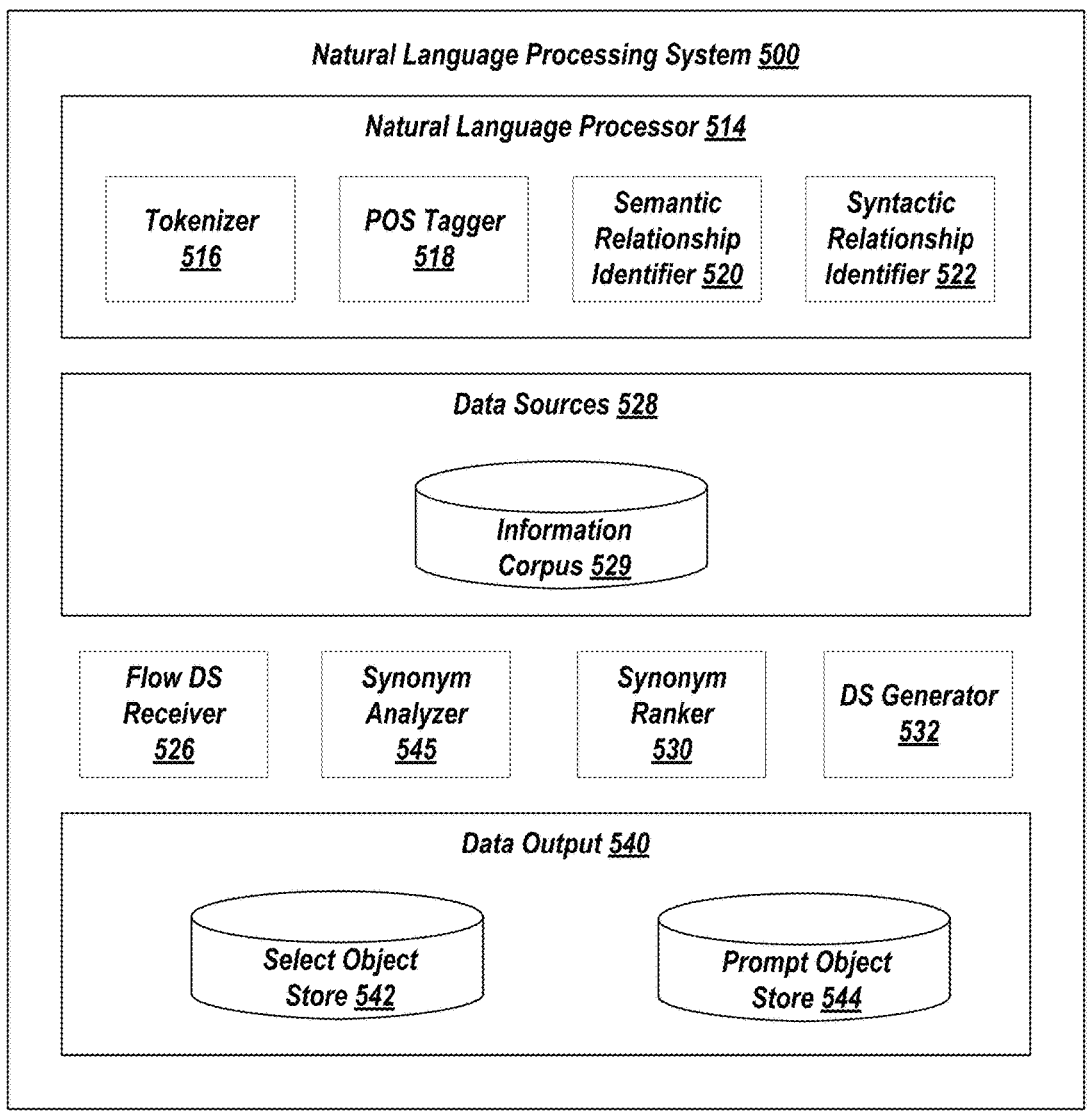
FIG. 7 illustrates an exemplary natural language processing system, according to one or more embodiments.

FIG. 7 illustrates an exemplary natural language processing system 500, according to one or more embodiments. Natural language processing system 500 is a module or program instructions that are configured analyze GUI objects identified in the flow data structure 480. In some embodiments, natural language processing system 500 receives the flow data structure 480 and obtains the visual representation of the GUI objects identified in the flow data structure 480, and generates select object and/or prompt object output data structures.

Consistent with various embodiments, the natural language processing system 500 may respond to the input of flow data structure 480 received by flow data structure receiver 526. Specifically, the natural language processing system 500 may analyze the GUI objects that are identified in the flow data structure 480 to create a language output of the select objects and synonyms to select objects and to create a language output of the prompt objects. In some embodiments, the natural language processing system 500 may include a natural language processor 514, data sources 528, a flow data structure receiver 526, a synonym analyzer 545, a synonym ranker 530, a language data structure generator 532, and language data output 540.

The natural language processor 514 may be a module or program instructions that analyze the display text characters of GUI objects. The natural language processor 514 may perform various methods and techniques for analyzing text characters of GUI objects (e.g., syntactic analysis, semantic analysis, etc.). The natural language processor 514 may be configured to recognize and analyze any number of natural languages. In some embodiments, the natural language processor 514 may parse text strings, words, phrases, numbers, and/or passages of the text characters of GUI objects. Further, the natural language processor 514 may include various modules to perform analyses of text characters of GUI objects. These modules may include, but are not limited to, a tokenizer 516, a part-of-speech (POS) tagger 518, a semantic relationship identifier 520, and/or a syntactic relationship identifier 522.

In some embodiments, the tokenizer 516 may be a computer module that performs lexical analysis. The tokenizer 516 may convert a sequence of characters into a sequence of tokens. A token may be a string of characters included in association with a GUI object and categorized as a meaningful symbol. Further, in some embodiments, the tokenizer 516 may identify word boundaries in a GUI object and break any text passages within the GUI object into their component text elements, such as words, multiword tokens, numbers, and punctuation marks. In some embodiments, the tokenizer 516 may receive a string of characters associated with each GUI object within each aggregated GUI screen, identify the lexemes in the string, and categorize them into tokens.

Consistent with various embodiments, the POS tagger 518 may be a computer module that marks up a word in a passage or phrase to correspond to a particular part of speech. The POS tagger 518 may read a passage or other text in natural language and assign a part of speech to each word or other token. The POS tagger 518 may determine the part of speech to which a word (or other text element) corresponds based on the definition of the word and the context of the word. The context of a word may be based on its relationship with adjacent and related words in a phrase, sentence, paragraph, or GUI screen. In some embodiments, the context of a word may be dependent on one or more previously analyzed GUI objects (e.g., the content of one GUI object may shed light on the meaning of text elements in another GUI object, particularly if they are located within the same GUI screen). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a word or passage with part of speech categories. In some embodiments, the POS tagger 518 may tag tokens or words of a passage to be parsed by other components of the natural language processing system 500.

In some embodiments, the semantic relationship identifier 520 may be a computer module that is configured to identify semantic relationships of recognized text elements (e.g., words, phrases) in documents. In some embodiments, the semantic relationship identifier 520 may determine functional dependencies between entities and other semantic relationships.

Consistent with various embodiments, the syntactic relationship identifier 522 may be a computer module that is configured to identify syntactic relationships in a word or passage composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may parse a data structure, GUI screens, or the like, and generate corresponding data structures for one or more portions of the applicable input. For example, in response to receiving a set of aggregated GUI screens or analyzing the flow map data structure 480 at the natural language processing system 500, the natural language processor 514 may output parsed text elements from the aggregated GUI screens or the flow map data structure 480 as data structures. In some embodiments, a parsed text element may be represented in the form of a parse tree or other graph structure. To generate the parsed text element, the natural language processor 514 may trigger computer modules 516-524.

The output of the natural language processor 514 may be analyzed against data stored in data sources 528 to determine synonyms to the analyzed word or phrase. For example, a parsed select GUI object by natural language processor 514 outputs a data structure indicating the select GUI object includes the word "Go", the synonym analyzer 545 may submit a query including the query input "go" against information corpus 529. The data sources 528 may return synonyms to the word "go" back to synonym analyzer 545. The synonym ranker 530 may rank the returned synonyms by degree of similarity to the query input and the ranked list of synonyms may be added to the appropriate data structure generated by data structure generator 532 associated with the query input "go". The exemplary synonyms that may be returned after the query of "go" to data sources 529 by information corpus 529 may be, "begin," "start," "proceed," or the like.

In some embodiments, data sources 528 may include data warehouses, information corpora, data models, and/or document repositories. The information corpus 529 may enable data storage and retrieval. In some embodiments, the information corpus 529 may be a storage mechanism that houses a standardized, consistent, clean, and integrated dictionaries, thesauruses, or the like. Data stored in the information corpus 529 may be structured in a way to specifically address analytic requirements. For example, the information corpus 529 may receive the ingested words or phrase as a query in order to return a list of synonyms to that words or phrase easier. In some embodiments, the information corpus 529 may be a relational database.

Data Structure generator 532 generates a select object data structure for a natural language analyzed select object and includes the select object and the synonyms associated with the parsed select object in the select data structure and stores the select object data structure in data output 540 in the select object store 542. Data Structure generator 532 also generates a prompt object data structure for a natural language analyzed prompt object and includes the parsed prompt object in the prompt object data structure and stores the prompt object data structure in data output 540 in the prompt object store 544.

In some embodiments, data output 540 may include data warehouses, information corpora, data models, and/or document repositories. The select object store 542 and prompt object store 544 may enable data storage and retrieval. In some embodiments, object store 542 and prompt object store 544 may be a storage mechanism that houses natural language processing system 500 select object data structures and prompt object data structures, respectively. Data stored in the data output 540 may be structured in a way to specifically address VUI input/output requirements. For example, the data output 540 may store data structures that may be integrated into a VUI for the GUI to ingest, understand, and output human speech. In some embodiments, the data output 540 may be a relational database.

Figure 8:
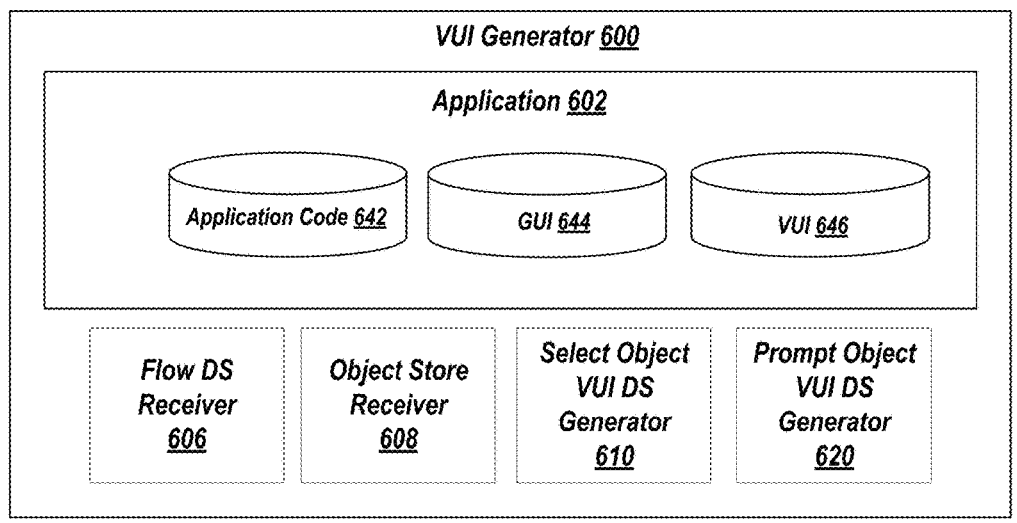
FIG. 8 illustrates an exemplary VUI generator, according to one or more embodiments.

FIG. 8 illustrates an exemplary VUI generator 600, according to one or more embodiments. VUI generator 600 develops VUI data structures utilized to present and receive audio/speech input or output from a user of an application that contains a GUI. VUI generator 600 includes an application 602 that was analyzed by parser 400 analyzed by natural language processing system 500, and further analyzed by VUI generator 600 to generate VUI data structures utilized to present and receive audio/speech input or output to/from a user of application 602. Application 602 includes a directory or portion 642 that contains function code or function program instructions to carry out the function of the application, a directory or portion 644 that contains GUI code or GUI program instructions to carry out the GUI of the application, and a directory or portion 646 that contains VUI code or VUI program instructions to carry out the VUI of the application.

VUI generator 600 may also include a flow data structure receiver 606 to accept a flow data structure 480 from parser 400, an object store data structure receiver 608 to receive a select object data structure from select object store 542 and/or to receive a prompt object data structure from prompt object store 544. VUI generator 600 also includes a select object VUI data structure generator 610 and a prompt object VUI data structure generator 620.

Select object VUI data structure generator 610 determines a ranking of flow paths and identification of select objects therewithin and/or a ranking of select objects within a plurality of flow paths from the flow map data structure 480 received at flow data structure receiver 606. The ranking order may establish an order to which select objects VUI data structures are formed by select object VUI data structure generator 610. Select object VUI data structure generator 610 determines which respective select object data structures within select object store 542 are associated with each ranked select object, obtains those associated data structures, generates a select object VUI data structure associated with each ranked select object, and stores the select object VUI data structures in a VUI directory or portion 646 within application 602.

Prompt object VUI data structure generator 620 determines a ranking of flow paths and identification of prompt objects therewithin and/or a ranking of prompt objects within a plurality of flow paths from the flow map data structure 480 received at flow data structure receiver 606. The ranking order may establish an order to which prompt object VUI data structures are formed by prompt object VUI data structure generator 620. Prompt object VUI data structure generator 620 determines which respective prompt object data structures within prompt object store 544 are associated with each ranked prompt object, obtains those associated data structures, generates a prompt object VUI data structure associated with each ranked prompt object, and stores the prompt object VUI data structures in VUI directory or portion 646 within application 602.

Figure 9:
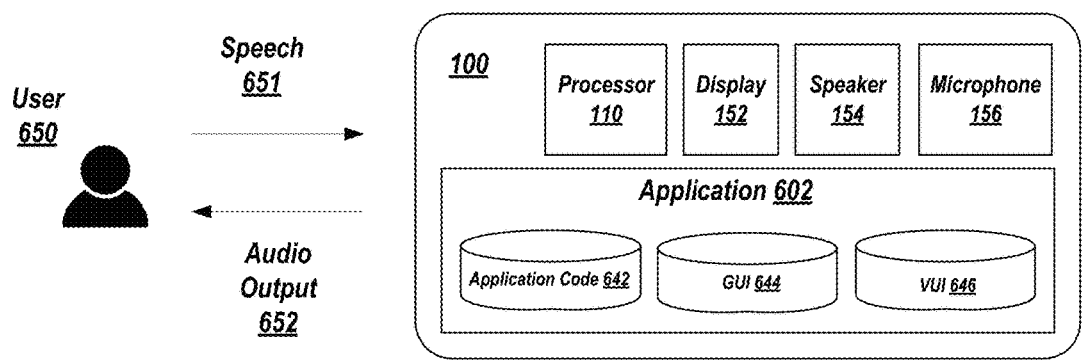
FIG. 9 illustrates an application user computing system receiving speech input and presenting audio speech output, according to one or more embodiments.

FIG. 9 illustrates an application 602 user computing system 100 receiving speech input and presenting audio speech output, according to one or more embodiments.

The select object VUI data structure is utilized by application 602 in order to receive a voice input 651 from a user 650 received by microphone 156, analyze the voice input, determine to which select GUI object that is displayed upon the GUI on display 152 is associated with the voice input, obtain the appropriate select object VUI data structure from VUI directory or portion 646, and analyze the voice input against the select object VUI data structure to determine whether the voice input equals the text of the determined select object within the select object data structure or whether the voice input equals a synonym of the text of the determined select object within the select object data structure. If the application 602 determines that the voice input does equals the text of the determined select object within the select object data structure or does equal a synonym of the text of the determined select object within the select object data structure, the application 602 begins or continues the flow path associated with the appropriate select object that is displayed within the GUI of application 602.

The prompt object VUI data structure is utilized by application 602 in order to obtain the appropriate VUI data structure from VUI directory or portion 646 that is associated with the prompt object displayed in a GUI on display 152, provide an audio output 652 of the prompt object that is displayed within the GUI of application 602, receive a voice prompt response input 651 from a user, analyze the voice prompt input 651, utilize the prompt response input 651 as an input of the application 602, and begin or continues the flow path associated with the prompt object that is displayed within the GUI of application 602.

Figure 10:
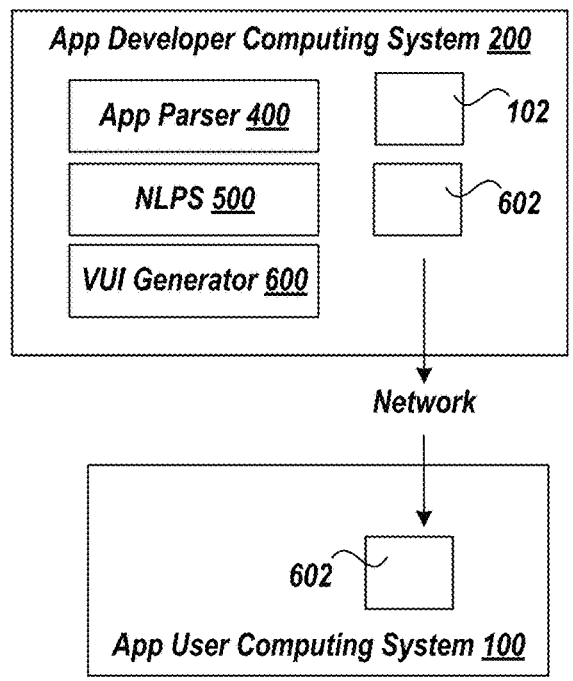
FIG. 10 illustrates an exemplary scheme wherein the GUI screen parser, the natural language processing system, and the VUI generator is local to the application developer computing system, according to one or more embodiments.

FIG. 10 illustrates an exemplary scheme wherein the GUI screen parser 400, natural language processing system 500, and VUI generator 600 are local to the application developer computing system 200. In these embodiments, the parser 400 inputs application 102 input information that is local to system 200, or the like computing device, and generates the output data structure 480 and outputs at least a portion of the output data structure 480 upon an I/O device associated with system 200. The natural language processing system 500 digests such output and generates select object data structure that includes the text of a select object and synonyms of the select object text and/or generates a prompt object data structure that includes the text of a prompt object. The VUI generator generates select object VUI data structure that is utilized to determine whether speech input 651 is equal to the text of a select object and synonyms of the select object text or generates a prompt object VUI data structure that is utilized to output the prompt of the prompt object as audio 652 and receive a prompt response speech input 651 from the user responding to the prompt audio output 652. The VUI data structures are integrated into the application 102 by storing the data structures within repository, directory, or portion 646 of the application thereby creating an application 602 that has VUI modality.

Upon implementation of one or more VUIs to application 102, thereby becoming an application 602 that includes VUI modality, mobile system 100 may receive application 602 directly from system 200 or another like computing device that is owned, maintained, controlled, by the same entity that owns, maintains, controls, etc. computing system 200. Alternatively, becoming application 602 that includes the GUI, mobile system 100 may receive application 602 indirectly from system 200 or another like computing device that is owned, maintained, controlled, by the same entity that owns, maintains, controls, etc. computing system 200 by a 3$^{rd}$ party computing system, such as an application retailer computing system. When GUI screen parser 400, natural language processing system 500, and VUI generator 600 are located in computing system 200, they may be evoked by the processor 210 by way of memory 220 to cause the system 200 to carry out the functions highlighted herein.

Figure 11:
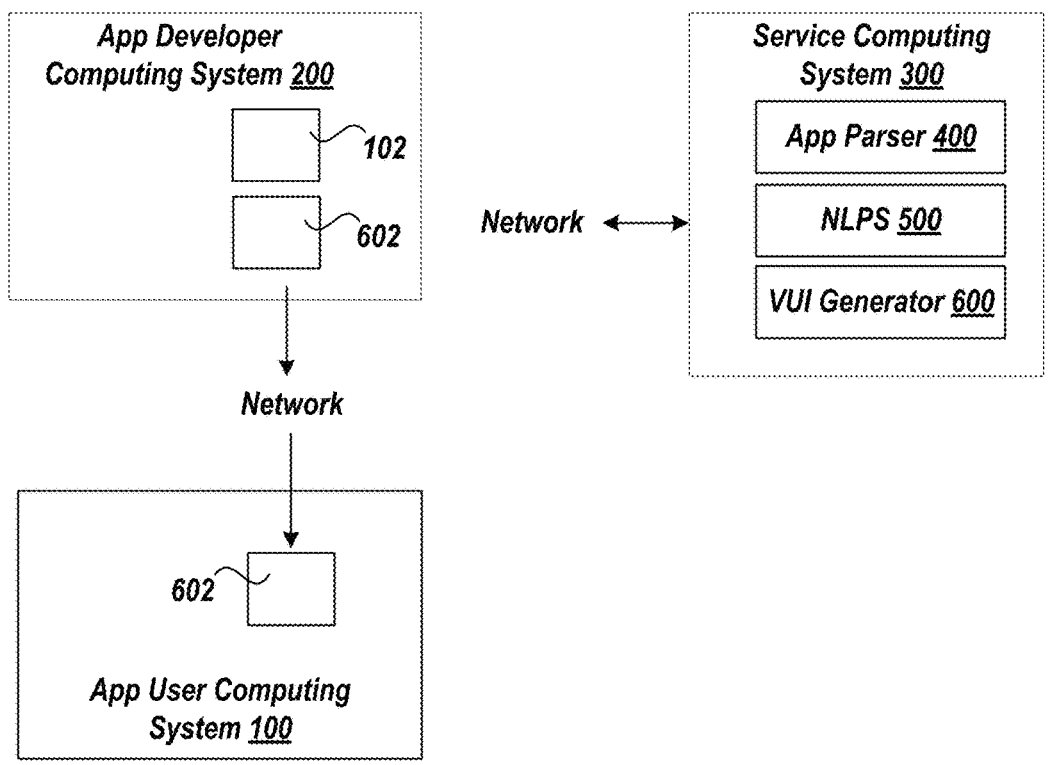
FIG. 11 illustrates an exemplary scheme wherein the GUI screen parser, the natural language processing system, and the VUI generator is local to the service computing system, according to one or more embodiments.

FIG. 11 illustrates an exemplary scheme wherein the GUI screen parser 400, natural language processing system 500, and VUI generator 600 are local to the service computing system 300. In these embodiments, the parser 400 inputs application 102 input information that is local to system 200, or the like computing device, and generates the output data structure 480 and outputs at least a portion of the output data structure 480 upon an I/O device associated with system 300. The natural language processing system 500 digests such output and generates select object data structure that includes the text of a select object and synonyms of the select object text and/or generates a prompt object data structure that includes the text of a prompt object. The VUI generator generates select object VUI data structure that is utilized to determine whether speech input 651 is equal to the text of a select object and synonyms of the select object text or generates a prompt object VUI data structure that is utilized to output the prompt of the prompt object as audio 652 and receive a prompt response speech input 651 from the user responding to the prompt audio output 652. The VUI data structures are integrated into the application 102 by storing the data structures within repository, directory, or portion 646 of the application thereby creating an application 602 that has VUI modality. Subsequently, the application 602, or alternatively, repository, directory, or portion 646 may be sent from service computer system 300 to computing system 200.

Upon implementation of one or more VUIs to application 102, thereby becoming an application 602 that includes VUI modality, mobile system 100 may receive application 602 directly from system 200 or another like computing device that is owned, maintained, controlled, by the same entity that owns, maintains, controls, etc. computing system 200. Alternatively, upon implementation of one or more VUIs to application 602, mobile system 100 may receive application 602 indirectly from system 200 or another like computing device that is owned, maintained, controlled, by the same entity that owns, maintains, controls, etc. computing system 200 by a 4$^{th}$ party computing system, such as an application retailer computing system. When GUI screen parser 400, natural language processing system 500, and VUI generator 600 are located in computing system 300, they may be evoked by the processor 310 by way of memory 320 to cause the system 300 to carry out the functions highlighted herein.

For clarity, an application 102 is referred to herein as an application that does not include VUI modality and an application 602 is referred to herein as an application that where VUI modality has been added by the processes of GUI parser 400, natural language processing system 500, and VUI generator 600 as described herein.

Figure 12:
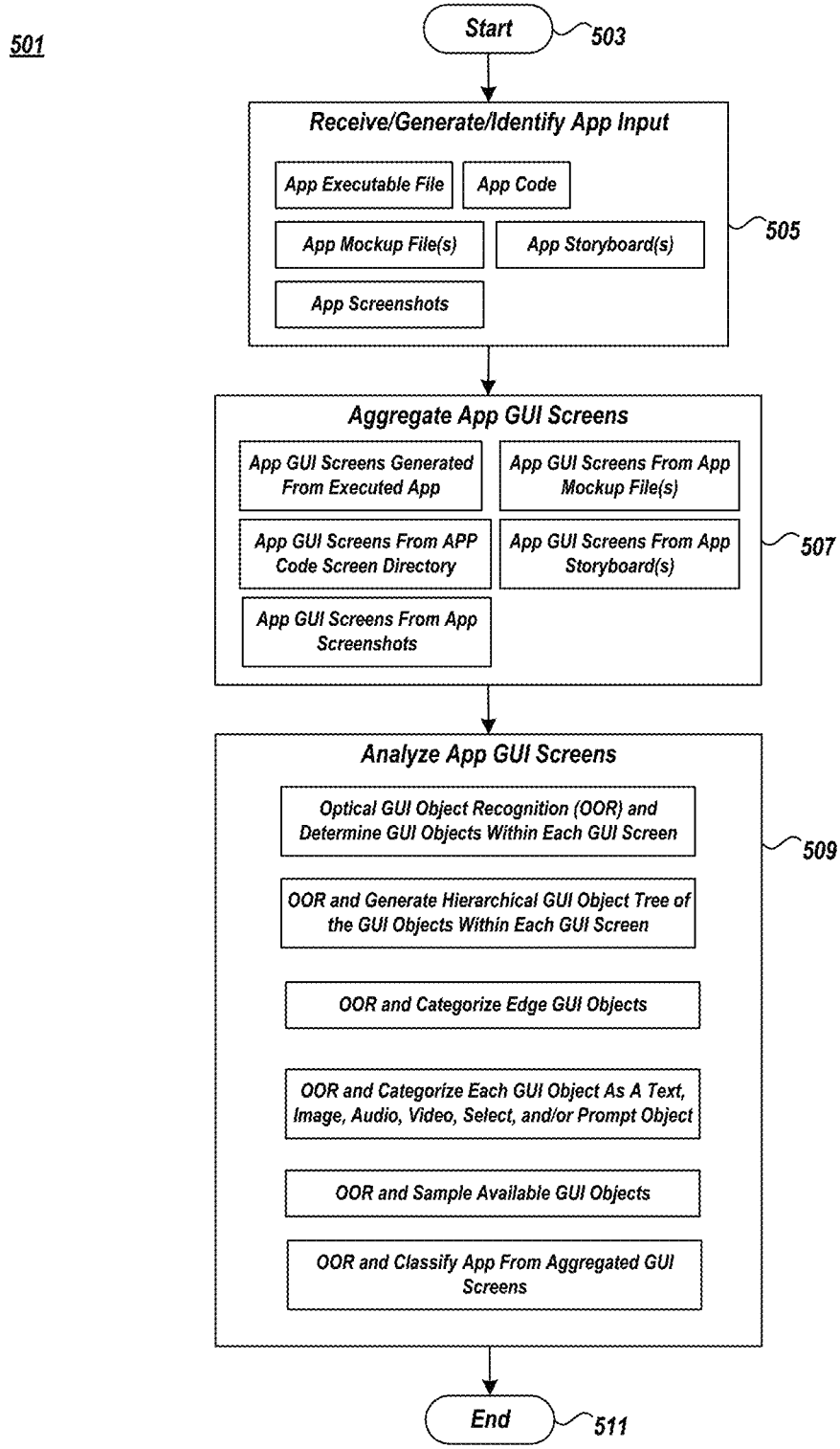
FIG. 12 illustrates a method for the GUI screen parser to analyze GUI screens, according to one or more embodiments.

FIG. 12 illustrates a method 501 for the GUI screen parser 400 to analyze GUI screens of application 102. Method 501 may be utilized GUI screen parser 400 to optically analyze GUI screens. Method 501 begins at block 503 and continues by parser 400 receiving, generating, or otherwise identifying application 102 input information (block 505). For example, application input receiver 412 receives an executable file of application 102, receives static code of application 102, receives one or more mockup files(s) of GUI screens of application 102, receives one or more application 102 storyboards that contain GUI screens, receives one or more screenshots of application 102 GUI screens, or the like.

Method 501 may continue by GUI screen parser 400 aggregating, assembling, or otherwise gathering GUI screens (block 507). For example, screen aggregator 414 may take a screen shot of the GUI of evoked application 102 after each change to the GUI, after a threshold time period elapses, after a threshold number of interactions or engagements of GUI objects is exceeded, or the like. In another example, screen aggregator 414 may assemble GUI screens from a GUI screen directory within the executable file of application 102. In another example, screen aggregator 414 may assemble GUI screen shots received by application input receiver 412. In another example, screen aggregator 414 may assemble GUI screens from one or more mockup files(s) of application 102 or from one or more application 102 storyboards.

Method 501 may continue by GUI screen parser 400 optically analyzing the assembled GUI screens (block 509). In one example, screen analyzer 416 utilizes OCR to identify text GUI objects, utilizes OIR to identify image GUI objects, utilizes OR to identify select objects, utilizes OIR to identify prompt objects, and the like. Screen analyzer 416 may further identify audio GUI objects and/or video GUI objects by the presence of predetermined text GUI objects and/or image GUI objects that when used in combination with the potential audio GUI objects and/or video GUI objects are indicative that the potential audio GUI objects and/or video GUI objects are, in fact, audio GUI objects and/or video GUI objects.

The GUI screen parser 400 may further generate a hierarchical GUI object tree of the optically identified GUI objects for each GUI screen. For example, the object tree generator may designate an identifier of the GUI screen as a root node and each optically identified GUI object within that GUI screen as primary leaf nodes.

The GUI screen parser 400 may further categorize or classify each optically identified GUI object into a GUI object class. For example, GUI object categorizer 428 determines an optically identified GUI object is an text output GUI object because that particular identified GUI object is configured to output text, determines a particular identified GUI object is an output image GUI object because that particular identified GUI object is configured to present image output data, determines a particular identified GUI object is an audio output GUI object because that particular identified GUI object is configured to present or control audio output data, determines a particular identified GUI object is an video output GUI object because that particular identified GUI object is configured to present or control video output data, determines a particular identified GUI object is an select object because it is optically apparent that the identified GUI object is configured to start or continue a flow path upon the selection of the object upon the manipulation or interaction of that GUI object by the user of the application, determines a particular identified GUI object is an prompt object because that particular identified GUI object is visually associated with a prompt receiver field to receive input from a user that is subsequently used by the application, or the like.

The GUI screen parser 400 may determine alternative GUI objects to those present in the analyzed GUI screen. A the same GUI screen may be sampled at different time instances or subsequent to different simulated user interactions with the GUI to determine the different GUI objects that may be presented in that GUI screen. In analyzing these samples of the same GUI screen, the GUI screen parser 400 may determine whether areas of the GUI screen are associated with GUI text objects, GUI image objects, GUI audio objects, and/or GUI video objects. Such areas may be so designated and each different GUI object within such areas may resultantly be classified as the applicable GUI object type. These alternative GUI objects may be included in the hierarchical GUI object tree. For example, if one particular optically identified image GUI object is presently included within the GUI screen and it is determined that there are nine other different optically identified images GUI objects that could have taken the place of the particular image GUI object, object tree generator may include all ten image GUI objects as nodes within the hierarchical GUI object tree.

The GUI screen parser 400 may further categorize or classify appropriate GUI objects optically identified as edge objects. For example, flow data receiver 460 may receive data from a user of the parser 400 that identifies particular objects as edge object if those objects are associated with GUI screen navigation flow. For example, a select object may be designated as an edge object if it begins or continues a flow path upon the manipulation or interaction of the GUI object by the user of the application and a prompt object may be designated as an edge object if it begins or continues a flow path upon the receipt of an associated prompt response input from the user of the application.

The GUI screen parser 400 may determine the class of application 102 based upon the information optical analysis of GUI screen analyzer 416. For example, class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application based upon the optically identified GUI objects. Method 501 ends at block 511.

Figure 13:
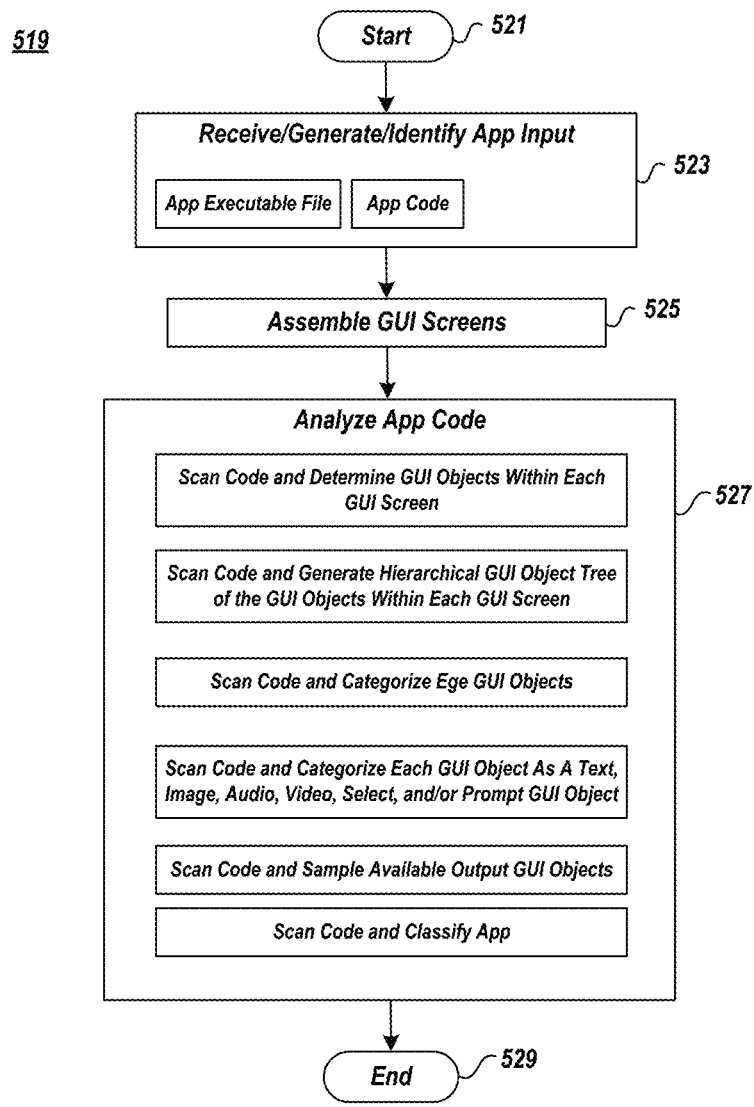
FIG. 13 illustrates a method for the GUI screen parser to analyze GUI screens, according to one or more embodiments.

FIG. 13 illustrates a method 519 for the GUI screen parser 400 to analyze GUI screens of application 102. Method 519 may be utilized GUI screen parser 400 to analyze GUI screens by statically scanning application 102 code. Method 519 begins at block 521 by parser 400 receiving, generating, or otherwise identifying application 102 input information (block 523). For example, application input receiver 412 receives an executable file of application 102, receives static code of application 102, or the like.

Method 519 may continue by GUI screen parser 400 aggregating, assembling, or otherwise gathering GUI screens (block 525). For example, screen aggregator 414 may take a screen shot of the GUI of evoked application 102 after each change to the GUI, after a threshold time period elapses, after a threshold number of simulated user interactions or engagements of GUI objects is exceeded, or the like. In another example, screen aggregator 414 may assemble GUI screens from a GUI screen directory or portion within the executable file of application 102.

Method 519 may continue by GUI screen parser 400 analyzing the assembled GUI screens by statically scanning application 102 code (block 527). In one example, static code analyzer 420 scans code of application 102 to identify text GUI objects within GUI screens, scans code of application 102 to identify image GUI objects within GUI screens, scans code of application 102 to identify audio GUI objects within GUI screens, scans code of application 102 to identify video GUI objects within GUI screens, scans code of application 102 to identify select objects within GUI screens, scans code of application 102 to identify prompt objects within GUI screens, and the like.

GUI screen parser 400 may further generate a hierarchical GUI object tree of the GUI objects identified by scanning code for each GUI screen in application 102. For example, the static code analyzer 420 and/or object tree generator may designate an identifier of the GUI screen as a root node and each identified GUI object within that GUI screen as primary leaf nodes.

The GUI screen parser 400 may further categorize or classify each GUI object identified by scanning code of application 102 into a GUI object class. For example, static code analyzer 420 and/or object categorizer 428 determines an identified GUI object is a text GUI object because the GUI object is configured to display text, determines an identified GUI object is an image GUI object because the GUI object is configured to display an image, determines an identified GUI object is an image GUI object because the GUI object associated with an audio output, determines an identified GUI object is an video GUI object because the GUI object is configured to display an video, determines a particular identified GUI object is an select object because that particular identified GUI object is configured to start or continue a flow path upon the selection of the object upon the manipulation or interaction of that GUI object by the user of the application, determines a particular identified GUI object is an prompt object because that particular identified GUI object is associated with a prompt to receive input from a user that is subsequently used by the application, or the like.

The GUI screen parser 400 may determine alternative GUI objects to those present in the analyzed GUI screen. The same section of code may be scanned at different time instances or subsequent to different simulated user interactions with the GUI to determine the different GUI objects that may be presented in that GUI screen. In analyzing these samples of the same code section, the GUI screen parser 400 may determine whether areas of the GUI screen are associated with GUI text objects, GUI image objects, GUI audio objects, GUI video objects, select objects, and/or prompt objects. Such areas may be so designated and each different GUI object within such areas may resultantly be classified as the applicable GUI object type, class, or the like. These alternative GUI objects may be included in the hierarchical GUI object tree. For example, if one particular image GUI object identified by scanning application 102 code is presently included within the GUI screen and it is determined that there are nine other different image GUI objects that could have taken the place of the particular image GUI object, static code analyzer 420 and/or object tree generator may include all ten image GUI objects as nodes within the hierarchical GUI object tree.

The GUI screen parser 400 may further categorize or classify each GUI object identified as an edge object. For example, static code analyzer 420 may scan for links (e.g., targets, pointers, or the like) that navigationally associate GUI screens or GUI objects within GUI screens. The GUI objects that may be displayed within GUI screens associated with such links may be identified as edge objects. For example, a select object may be designated as an edge object if it begins or continues a flow path upon the manipulation or interaction of the GUI object by the user of the application and a prompt object may be designated as an edge object if it begins or continues a flow path upon the receipt of an associated prompt response input from the user of the application.

The GUI screen parser 400 may determine the class of application 102 by scanning application 102 code. For example, static code analyzer 420 and/or class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application based upon the identified GUI objects. Method 519 ends at block 529.

Figure 14:
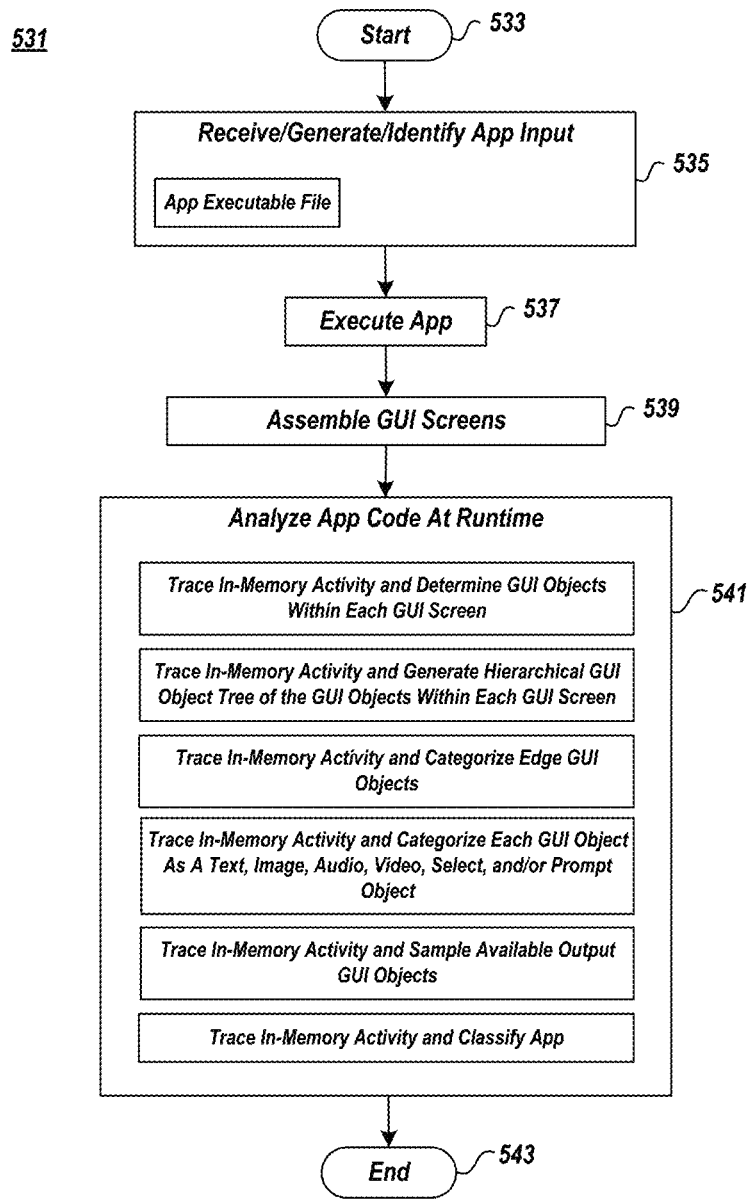
FIG. 14 illustrates a method for the GUI screen parser to analyze GUI screens, according to one or more embodiments.

FIG. 14 illustrates a method 531 for the GUI screen parser 400 to analyze GUI screens of application 102. Method 531 may be utilized GUI screen parser 400 to analyze GUI screens by tracing in memory activity of the evoked application 102. Method 531 begins at block 533 and continues by parser 400 receiving, generating, or otherwise identifying application 102 input information (block 535). For example, application input receiver 412 receives an executable file of application 102, or the like. Method 531 may continue by evoking the executable file of application 102 by processor 210 or processor 310 via memory 220 or memory 230, respectively (block 537).

Method 531 may continue by GUI screen parser 400 aggregating, assembling, or otherwise gathering GUI screens (block 539). For example, screen aggregator 414 may take a screen shot of the GUI of evoked application 102 after each change to the GUI, after a threshold time period elapses, after a threshold number of simulated user interactions or engagements of GUI objects is exceeded, or the like. In another example, screen aggregator 414 may assemble GUI screens from a GUI screen directory within the executable file of application 102.

Method 531 may continue by GUI screen parser 400 analyzing the assembled GUI screens by tracing in memory actively of the evoked application 102 (block 541). In one example, tracer 422 traces in memory activity of evoked code of application 102 to identify text GUI objects within GUI screens, traces in memory activity of evoked code of application 102 to identify image GUI objects within GUI screens, traces in memory activity of evoked code of application 102 to identify audio GUI objects within GUI screens, traces in memory activity of evoked code of application 102 to identify video GUI objects within GUI screens, traces in memory activity of evoked code of application 102 to identify select objects, and/or traces in memory activity of evoked code of application 102 to identify prompt objects within GUI screens within GUI screens and the like.

GUI screen parser 400 may further generate a hierarchical GUI object tree of the GUI objects identified tracing in memory activity of evoked application 102. For example, the tracer 422 may designate an identifier of the GUI screen as a root node and each identified GUI object within that GUI screen as primary leaf nodes.

The GUI screen parser 400 may further categorize or classify each GUI object identified as an edge object if that GUI object. For example, tracer 422 or edge object categorizer 430 may identify links (e.g., targets, pointers, or the like) that navigationally associate GUI screens or GUI objects within GUI screens. The GUI objects that may be displayed within GUI screens associated with such links may be identified as edge objects. For example, a select object may be designated as an edge object if it begins or continues a flow path upon the manipulation or interaction of the GUI object by the user of the application and a prompt object may be designated as an edge object if it begins or continues a flow path upon the receipt of an associated prompt response input from the user of the application.

The GUI screen parser 400 may further categorize or classify each GUI object identified by tracing in memory activity of the evoked application 102 into a GUI object class. For example, tracer 422 and/or object categorizer 428 determines an identified GUI object is a text GUI object because the GUI object is configured to display text, determines an identified GUI object is an image GUI object because the GUI object is configured to display an image, determines an identified GUI object is an image GUI object because the GUI object associated with an audio output, determines an identified GUI object is an video GUI object because the GUI object is configured to display an video, determines a particular identified GUI object is an select object because that particular identified GUI object is configured to start or continue a flow path upon the selection of the object upon the manipulation or interaction of that GUI object by the user of the application, determines a particular identified GUI object is an prompt object because that particular identified GUI object is associated with a prompt to receive input from a user that is subsequently used by the application, or the like, or the like.

The GUI screen parser 400 may determine alternative GUI objects to those present in the analyzed GUI screen. The same section of evoked code may be traced at different time instances or subsequent to different simulated user interactions with the GUI to determine the different GUI objects that may be presented in that GUI screen. In analyzing these in memory traces of the same evoked code section, the GUI screen parser 400 may determine whether areas of the GUI screen are associated with GUI text objects, GUI image objects, GUI audio objects, and/or GUI video objects. Such areas may be so designated and each different GUI object within such areas may resultantly be classified as the applicable GUI object type, class, or the like. These alternative GUI objects may be included in the hierarchical GUI object tree. For example, if one particular image GUI object identified by tracing in memory activity of evoked application 102 code is presently included within the GUI screen and it is determined that there are nine other different image GUI objects that could have taken the place of the particular image GUI object, tracer 422 and/or object tree generator may include all ten image GUI objects as nodes within the hierarchical GUI object tree.

The GUI screen parser 400 may determine the class of application 102 by tracing in memory activity of evoked application 102. For example, static code analyzer 420 and/or class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application based upon the identified GUI objects. Method 531 ends at block 543.

Figure 15:
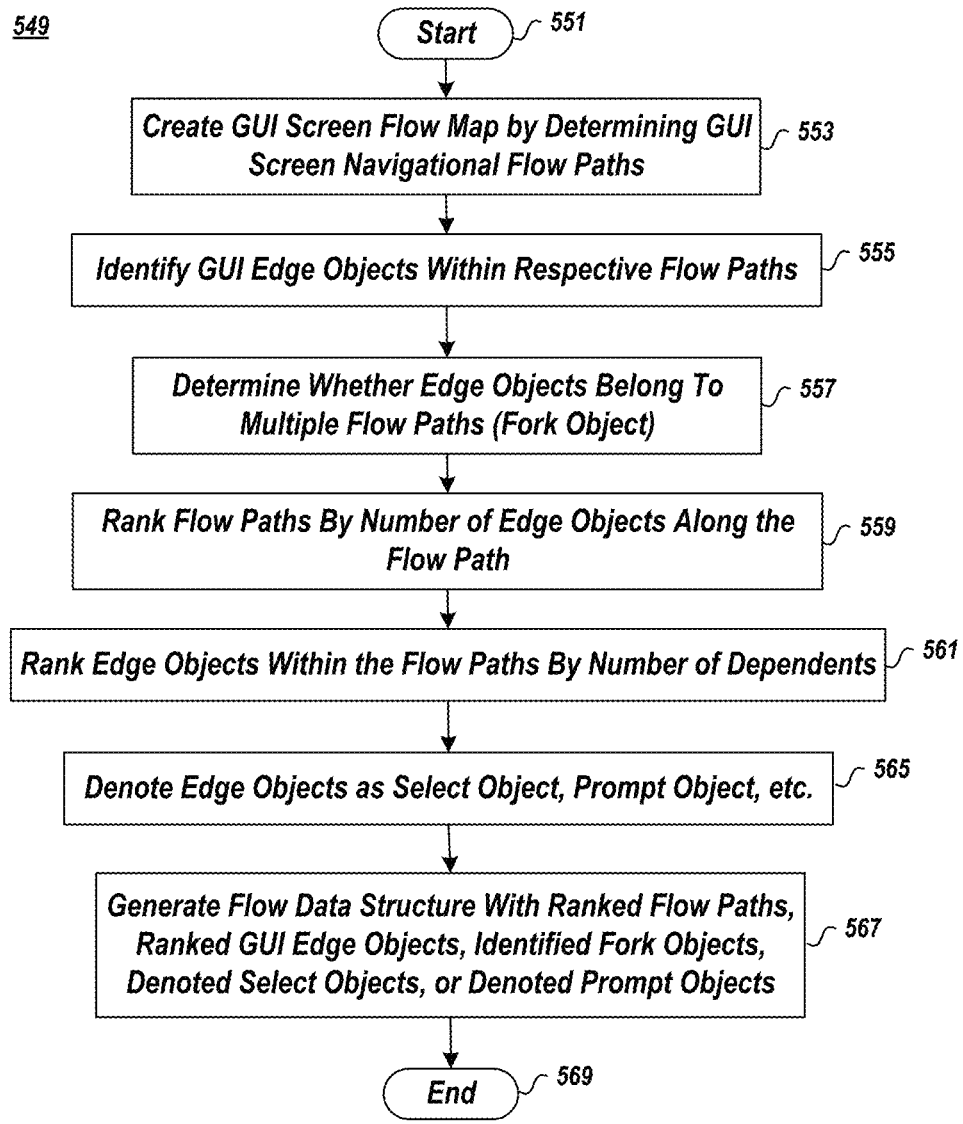
FIG. 15 illustrates a method to generate a GUI screen flow data structure, according to one or more embodiments.

FIG. 15 illustrates a method 549 to generate a GUI screen flow data structure 480, according to one or more embodiments. Method 549 may be utilized by parser 400 to generate the data structure 480 subsequent to the aggregating and parsing of GUI screens to determine and organize the various GUI objects therewithin. Method begins at block 551 and continues with creating a GUI screen flow map by determining the GUI screen navigational flow paths. For example, flow map generator 426 may create a flow map utilizing the hierarchical object trees associated with the GUI screens as a template by identifying flow paths that are defined by linking edge objects within a particular GUI screen navigation flow associated with a set of user GUI interactions/inputs or may be defined by navigational links or targets that exist within the GUI code between GUI screens or that exist between GUI objects.

Method 549 may continue by designating or otherwise identify the edge objects within the flow paths in the flow path map (block 555). flow map analyzer 450 may identify an edge object by writing metadata that designates such GUI object as an edge object within the flow path map. Such designations may be made to those GUI object within a GUI screen that is associated with, directs, or influences what is displayed upon subsequent GUI screens or is a GUI object in a subsequent GUI screen that is dependent upon a prior GUI object.

Method 549 may continue by determining whether any edge objects below to multiple flow paths and is therefore considered a fork object (block 557). If the same edge object belongs to two different flow paths, flow map analyzer 450 may identify an edge object as a fork object by writing metadata that designates such edge object as a fork object within the flow path map.

Method 549 may continue by ranking the flow paths by the number of edge objects within the flow path (block 559). For example, flow map analyzer 450 may give the best ranking to the flow path that includes the highest number of edge objects, or the like. Method 549 may continue with ranking the edge objects within flow paths by the number of edge objects that are dependent or downstream thereto (block 561). For example, flow map analyzer 450 may give the best ranking to the primary edge object within the longest flow path that has the highest number of edge objects that are downstream of the primary object.

Method 549 may continue by determining whether the edge objects within the flow paths are select edge objects or are prompt select objects (block 565). Flow map analyzer 450 may identify a GUI object as a select object if that GUI object is selectable by manipulation or engagement by the user of the application to implement or change function of the application. Flow map analyzer 450 may identify a GUI object as a prompt object if that GUI object is associated with receiving input characters from the user of the application.

Method 549 may continue with generating the flow path data structure 480 with ranked flow paths, ranked edge objects, identified fork objects, identified select objects, identified prompt objects, and/or the like (block 567). Flow map analyzer 450 may generate the flow map data structure 480 in tabular form and may include a rank column, a GUI object identifier column, a GUI screen identifier column, number of dependent edge object column, a number of preceding or ancestor edge object column, a fork object designation column, a flow path identifier, a flow path length column, GUI object classification column, and/or the like. Method 549 ends at block 569.

Figure 16:
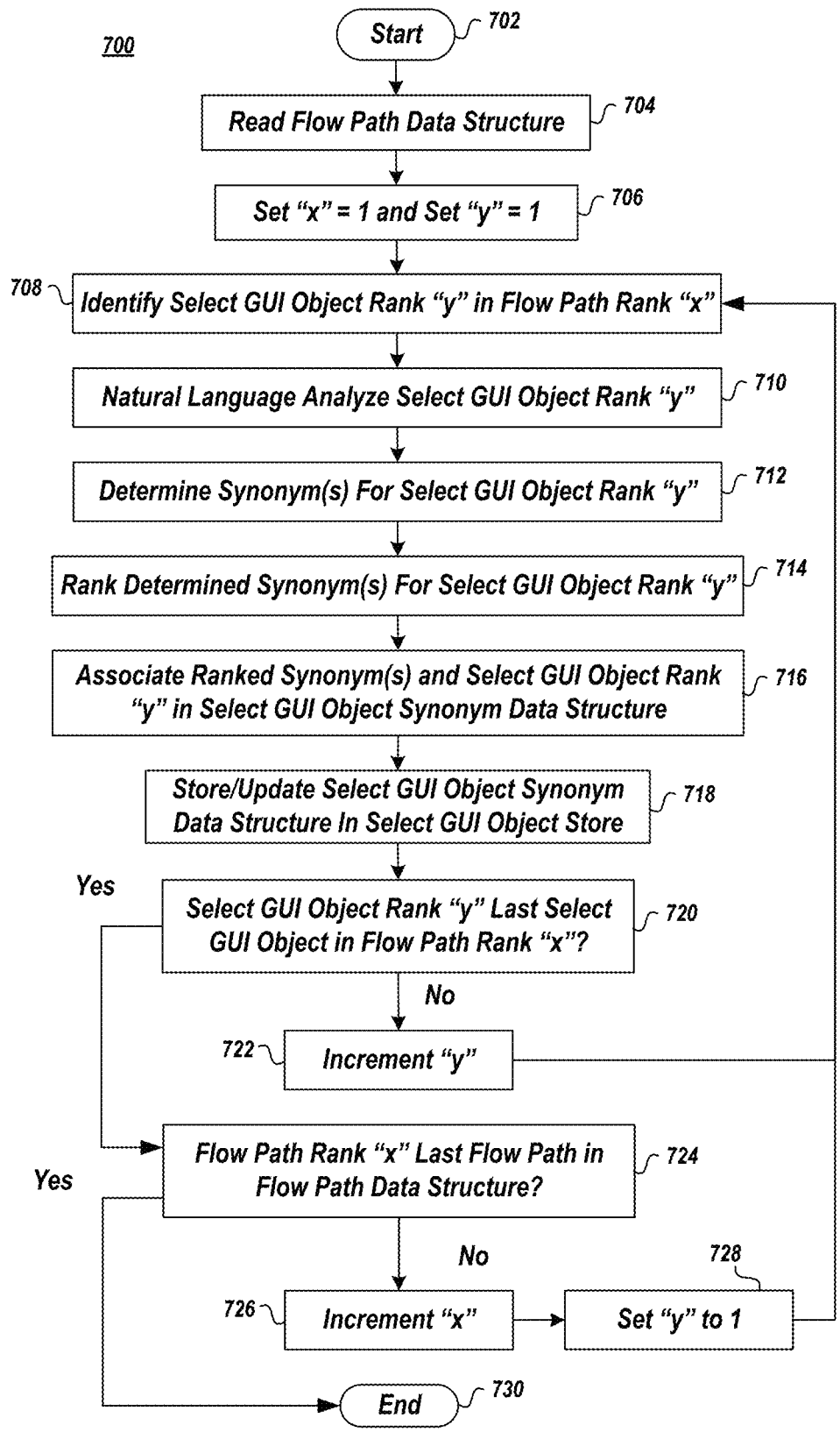
FIG. 16 illustrates a method to create a select GUI object synonym data structure for select GUI objects within the GUI screen flow data structure, according to one or more embodiments.

FIG. 16 illustrates a method 700 to create a select object synonym data structure for select objects within the GUI screen flow data structure 480, according to one or more embodiments. Method 700 may be utilized by natural language processing system 500 to generate a select object synonym data structure for select objects within the flow data structure 480 that includes the characters of the select object and synonyms of the characters of the select object. Method 700 begins at block 702 and continues with the natural langue processing system 500 reading the flow path data structure 480 (block 704). For example, flow map data structure receiver 526 reads flow path data structure 480.

Method 700 may continue with natural langue processing system 500 setting an iteration variable "x" equal to 1 and an iteration variable "y" equal to 1 (block 706). The variable "x" is generally associated with designating a flow path within the flow path data structure 480 and the variable "y" is generally associated with designating an edge object within a flow path.

Method 700 may continue with identifying select object rank "y" in flow path rank "x" (block 708). For example, during a first iteration, natural langue processing system 500 determines if the edge object that is ranked 1 within flow path rank 1 is designated as a select object. If the edge object that is ranked 1 within flow path rank 1 is not designated as a select object, method 700 continues at block 722. As such, this technique generally identifies the highest ranked select object in the highest ranked flow path (e.g., the select object with the most downstream edge objects within the flow path that includes the most edge objects, or the like).

If the edge object that is ranked 1 within flow path rank 1 is designated as a select object, the select object rank "y" is analyzed by the natural language processing system 500 to determine the characters displayed in association (e.g., within, or the like) with the select object rank "y" (block 710). For example, a GUI object that displays the text "Go" and that may be selected by the user of the application to begin a particular processes or function may be analyzed by natural language processing system 500 to determine the select object is displaying the word "go".

Method 700 may continue with the natural language processing system 500 determining synonyms of the characters displayed in association (e.g., within, or the like) with the select object rank "y" (block 712). For example, the synonym analyzer 545 may submit a query including the query input "go" against information corpus 529. The data sources 528 may return synonyms to the word "go" back to synonym analyzer 545. Exemplary synonyms to the analyzed output "go" may be "begin," "start," "proceed," or the like.

Method 700 may continue with the natural language processing system 500 ranking the synonyms of the characters displayed in association (e.g., within, or the like) with the select object rank "y" (block 714). For example, the synonym ranker 530 may rank the returned synonyms by degree of similarity to the query input.

Method 700 may continue with natural language processing system 500 storing a select object synonym data structure in the select object store 542 associated with the select object rank "y" or updating an preexisting select object synonym data structure in the select object store 542 associated with the select object rank "y" (block 718). For example, data structure 532 stores a data structure including the word "go" and the synonyms "begin," "start," "proceed" in a select object synonym data structure associated with the select object that is associated with the characters "go" to select object store 542.

Method 700 may continue with the natural language processing system 500 determining that the select object rank "y" is the last select object in flow path "x" (block 720). If the select object rank "y" is not the last select object in flow path "x", the variable "y" is incremented (block 722) and method 700 returns to block 708 to analyze the next select object in the same flow path.

If the select object rank "y" is the last select object in flow path "x", method 700 may continue with the natural language processing system 500 determining whether the flow path rank "x" is the last flow path in the flow path data structure 480 (block 724). If the flow path rank "x" is the last flow path in the flow path data structure 480, method 700 ends at block 730. If the flow path rank "x" is not the last flow path in the flow path data structure 480, variable "x" is incremented (block 726) and variable "y" is reset back to 1 (block 728) in order to analyze the next ranked flow path and the highest ranked select object therewithin. Method 700 then returns to block 708.

Figure 17:
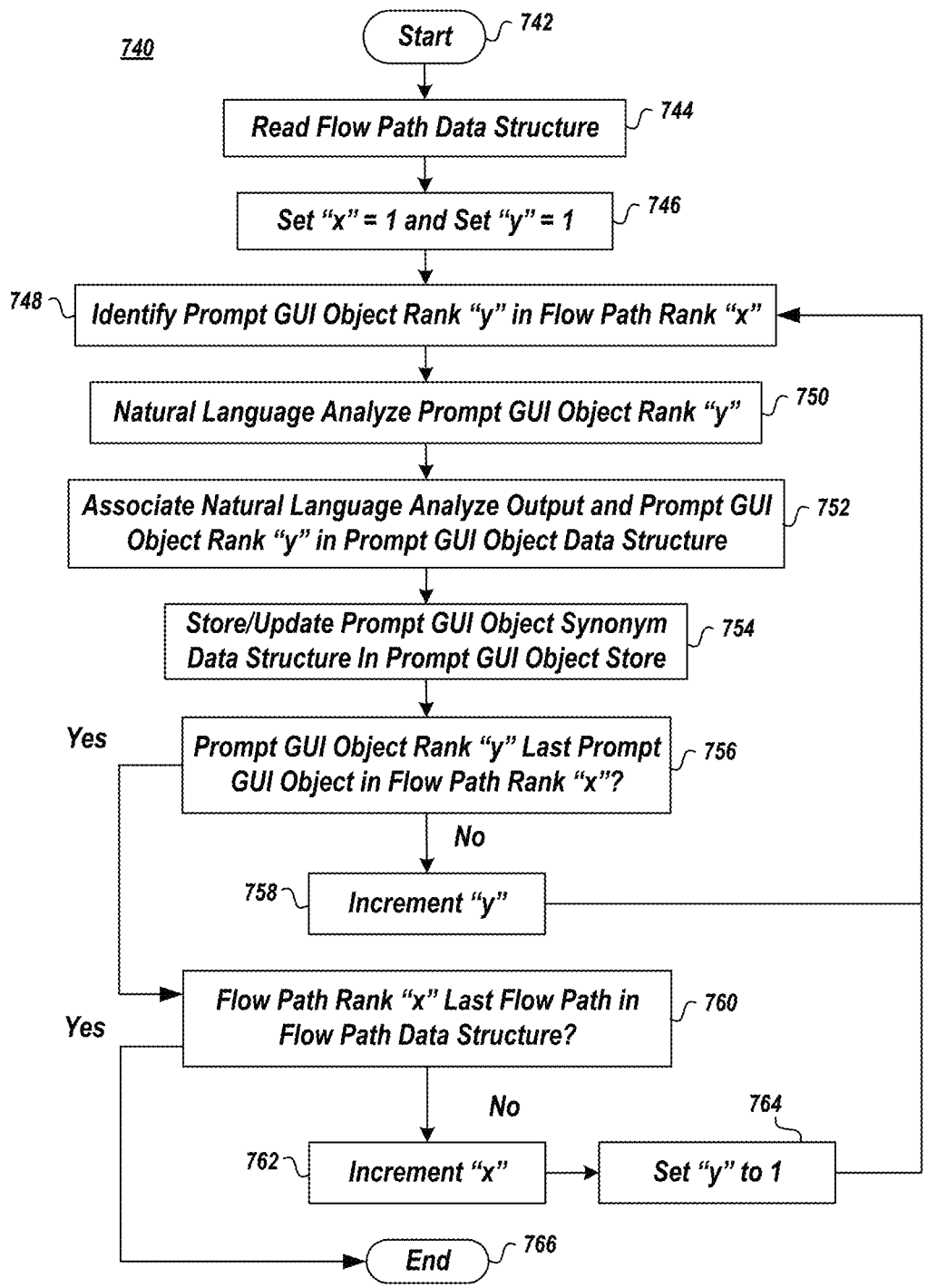
FIG. 17 illustrates a method to create a prompt GUI object data structure for prompt GUI objects within the GUI screen flow data structure, according to one or more embodiments.

FIG. 17 illustrates a method 740 to create a prompt GUI object data structure for prompt objects within the screen flow data structure 480, according to one or more embodiments. Method 740 may be utilized by natural language processing system 500 to generate a prompt object data structure for prompt objects within the flow data structure 480 that includes the characters of the prompt object. Method 740 begins at block 742 and continues with the natural langue processing system 500 reading the flow path data structure 480 (block 744). For example, flow map data structure receiver 526 reads flow path data structure 480.

Method 740 may continue with natural langue processing system 500 setting an iteration variable "x" equal to 1 and an iteration variable "y" equal to 1 (block 746). The variable "x" is generally associated with designating a flow path within the flow path data structure 480 and the variable "y" is generally associated with designating an edge object within a flow path.

Method 740 may continue with identifying prompt object rank "y" in flow path rank "x" (block 748). For example, during a first iteration, natural langue processing system 500 determines if the edge object that is ranked 1 within flow path rank 1 is designated as a prompt object. If the edge object that is ranked 1 within flow path rank 1 is not designated as a prompt object, method 740 continues at block 758. As such, this technique generally identifies the highest ranked prompt object in the highest ranked flow path (e.g., the prompt object with the most downstream edge objects within the flow path that includes the most edge objects, or the like).

If the edge object that is ranked 1 within flow path rank 1 is designated as a prompt object, the prompt object rank "y" is analyzed by the natural language processing system 500 to determine the prompt characters displayed in association (e.g., within, or the like) with the prompt object rank "y" (block 750). For example, a GUI object that displays the text "Enter Number" to prompt the user of the application to enter an input that is subsequently utilized by the application may be analyzed by natural language processing system 500 to determine the prompt object is displaying the phrase "enter number".

Method 740 may continue with natural language processing system 500 storing a prompt object data structure in the prompt object store 544 (block 754) associated with the prompt object rank "y" (block 752) or updating an preexisting prompt object data structure in the prompt object store 544 associated with the select object rank "y". For example, data structure generator 532 stores a data structure including the word "Enter Number" in a prompt object data structure associated with the prompt object rank "y" to prompt object store 544.

Method 740 may continue with the natural language processing system 500 determining that the prompt object rank "y" is the last prompt object in flow path "x" (block 756). If the prompt object rank "y" is not the last prompt object in flow path "x", the variable "y" is incremented (block 758) and method 740 returns to block 748 to analyze the next prompt object in the same flow path.

If the select object rank "y" is the last prompt object in flow path "x", method 740 may continue with the natural language processing system 500 determining whether the flow path rank "x" is the last flow path in the flow path data structure 480 (block 760). If the flow path rank "x" is the last flow path in the flow path data structure 480, method 740 ends at block 766. If the flow path rank "x" is not the last flow path in the flow path data structure 480, variable "x" is incremented (block 762) and variable "y" is reset back to 1 (block 764) in order to analyze the next ranked flow path and the highest ranked prompt object therewithin. Method 740 then returns to block 748.

Figure 18:
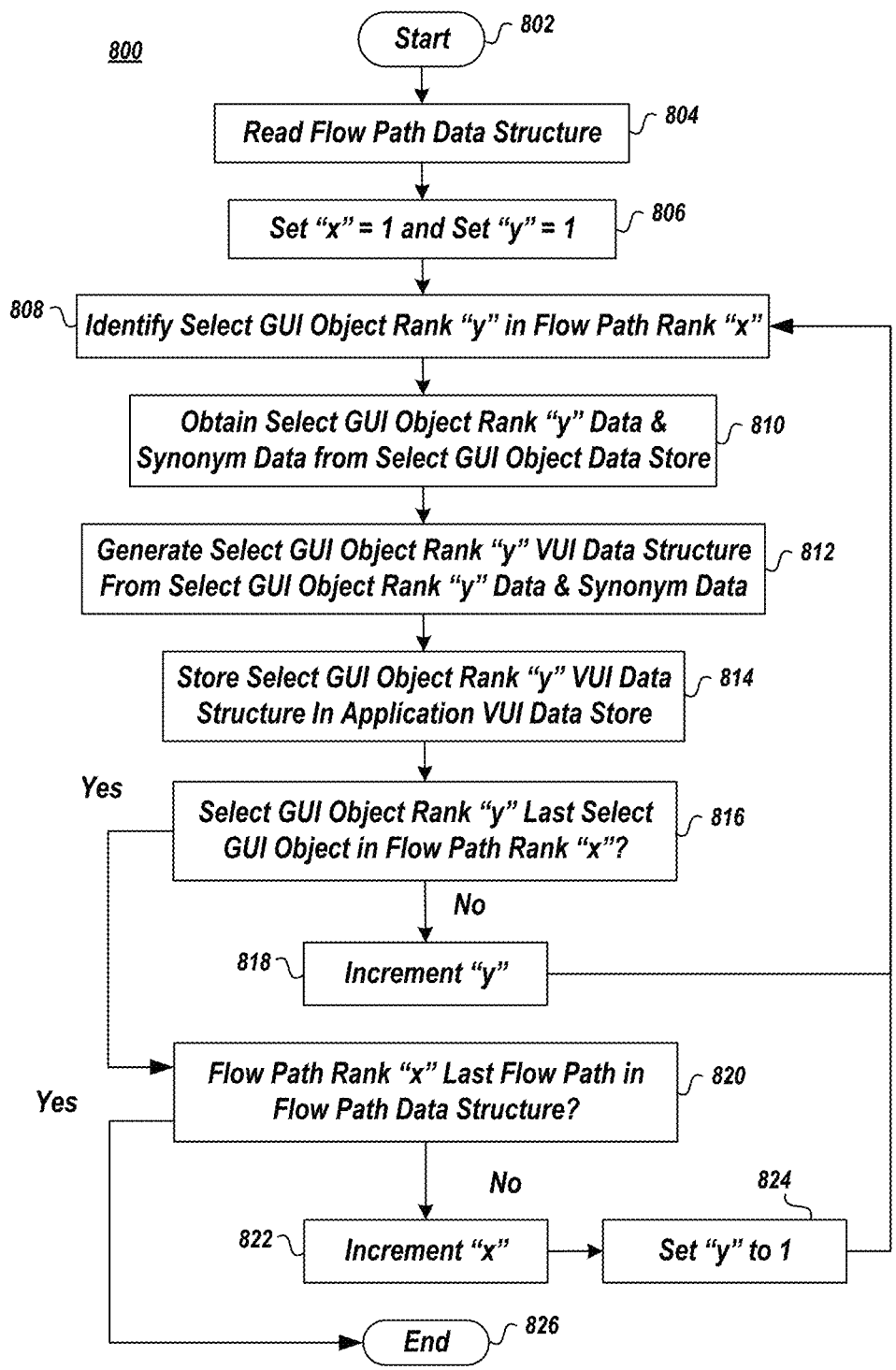
FIG. 18 illustrates a method to create a select object synonym VUI data structure for select GUI objects within the GUI screen flow data structure, according to one or more embodiments.

FIG. 18 illustrates a method 800 to create a select object synonym VUI data structure for select objects within the GUI screen flow data structure 480 from the associated select object synonym data structure obtained from select object store 542, according to one or more embodiments. Method 800 may be utilized by VUI generator 600 to generate VUI data structures utilized to present and receive audio/speech input or output. Method 800 begins at block 802 and continues with VUI generator 600 reading the flow path data structure 480 (block 804). For example, flow map data structure receiver 606 reads flow path data structure 480.

Method 800 may continue with VUI generator 600 setting an iteration variable "x" equal to 1 and an iteration variable "y" equal to 1 (block 806). The variable "x" is generally associated with designating a flow path within the flow path data structure 480 and the variable "y" is generally associated with designating an edge object within a flow path.

Method 800 may continue with identifying select object rank "y" in flow path rank "x" (block 808). For example, during a first iteration, VUI generator 600 determines if the edge object that is ranked 1 within flow path rank 1 is designated as a select object. If the edge object that is ranked 1 within flow path rank 1 is not designated as a select object, method 800 continues at block 818. As such, this technique generally identifies the highest ranked select object in the highest ranked flow path (e.g., the select object with the most downstream edge objects within the flow path that includes the most edge objects, or the like).

If the edge object that is ranked 1 within flow path rank 1 is designated as a select object, the select object rank "y" is identified by VUI generator 600 and the associated select object synonym data structure is obtained from select object store 542 (block 810). For example, a GUI object that displays the text "Go" and that may be selected by the user of the application to begin a particular processes or function may be identified by VUI generator and the associated select object synonym data structure is read by object store receiver 608.

Method 800 may continue with the VUI generator 600 creating a VUI data structure for select object "y" so that the VUI may utilize the VUI data structure to implement a VUI that enables speech input 651 comprising the characters displayed by the speech object or synonyms of the characters displayed to evoke the application function associated with manipulating the select object (block 812). For example, select object data structure generator 610 generates a VUI data structure for the select object "y" so that the VUI may utilize the VUI data structure to implement a VUI that enables speech input 651 comprising the spoken characters displayed by the speech object or spoken synonyms of the characters displayed to evoke the application function associated with manipulating the select object "y".

Method 800 may continue with VUI generator 600 storing the select object "y" VUI data structure in the application VUI data repository or portion 646 (block 814). For example, select object data structure generator 610 writes the select object "y" VUI data structure to a created portion 646 within the application, enabling the application with VUI modality.

Method 800 may continue with the VUI generator 600 determining that the select object rank "y" is the last select object in flow path "x" (block 816). If the select object rank "y" is not the last select object in flow path "x", the variable "y" is incremented (block 818) and method 800 returns to block 808 to analyze the next select object in the same flow path.

If the select object rank "y" is the last select object in flow path "x", method 800 may continue with VUI generator 600 determining whether the flow path rank "x" is the last flow path in the flow path data structure 480 (block 820). If the flow path rank "x" is the last flow path in the flow path data structure 480, method 800 ends at block 826. If the flow path rank "x" is not the last flow path in the flow path data structure 480, variable "x" is incremented (block 822) and variable "y" is reset back to 1 (block 824) in order to generate a VUI data structure for the highest ranked select object within the next ranked flow path. Method 800 then returns to block 808.

Figure 19:
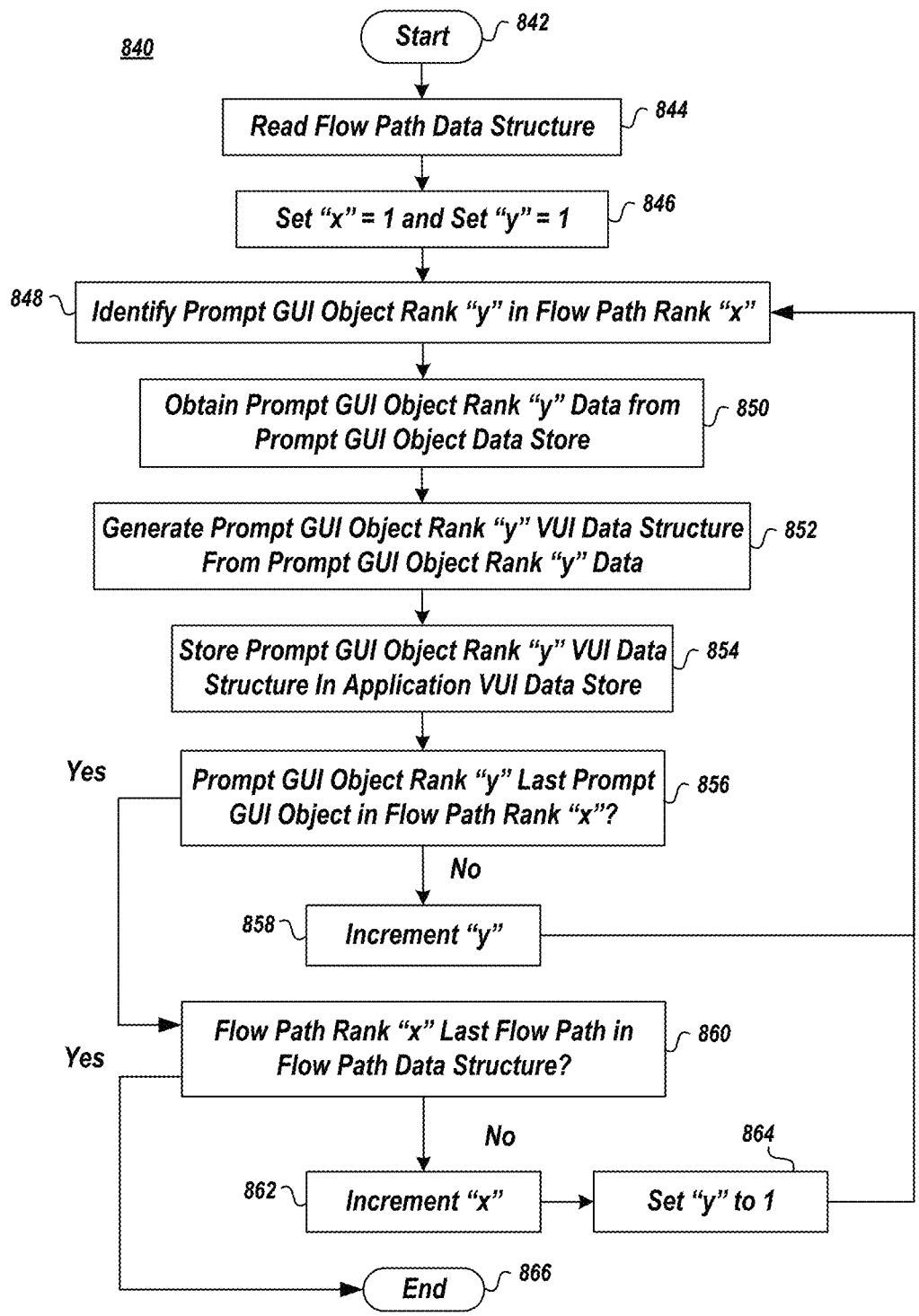
FIG. 19 illustrates a method to create a prompt object VUI data structure for prompt GUI objects within the GUI screen flow data structure, according to one or more embodiments.

FIG. 19 illustrates a method to create a prompt object VUI data structure for prompt GUI objects within the GUI screen flow data structure from the associated prompt object data structure obtained from prompt object store 544, according to one or more embodiments. Method 840 may be utilized by VUI generator 600 to generate VUI data structures utilized to present and receive audio/speech input or output. Method 840 begins at block 842 and continues with VUI generator 600 reading the flow path data structure 480 (block 844). For example, flow map data structure receiver 606 reads flow path data structure 480.

Method 840 may continue with VUI generator 600 setting an iteration variable "x" equal to 1 and an iteration variable "y" equal to 1 (block 846). The variable "x" is generally associated with designating a flow path within the flow path data structure 480 and the variable "y" is generally associated with designating an edge object within a flow path.

Method 840 may continue with identifying prompt object rank "y" in flow path rank "x" (block 848). For example, during a first iteration, VUI generator 600 determines if the edge object that is ranked 1 within flow path rank 1 is designated as a prompt object. If the edge object that is ranked 1 within flow path rank 1 is not designated as a prompt object, method 840 continues at block 858. As such, this technique generally identifies the highest ranked prompt object in the highest ranked flow path (e.g., the prompt object with the most downstream edge objects within the flow path that includes the most edge objects, or the like).

If the edge object that is ranked 1 within flow path rank 1 is designated as a prompt object, the prompt object rank "y" is identified by VUI generator 600 and the associated prompt object data structure is obtained from prompt object store 544 (block 850). For example, a GUI object that displays the prompt "Enter Number" and is associated with a number input provided by the user of the application may be identified by VUI generator and the associated prompt object data structure is read by object store receiver 608.

Method 840 may continue with the VUI generator 600 creating a VUI data structure for prompt object "y" so that the VUI may utilize the VUI data structure to implement a VUI that enables audio output 652 comprising the characters displayed by the prompt object and receive speech input 651 comprising voice prompt response in order to evoke the application function associated with the prompt object and prompt response input (block 852). For example, prompt object data structure generator 612 generates a VUI data structure for the prompt object "y" so that the VUI may utilize the VUI data structure to implement a VUI that enables audio output 652 comprising the spoken or audio characters displayed by the prompt object and receive speech input 651 comprising a voice prompt response to evoke the application function associated with the prompt object and prompt response input.

Method 840 may continue with VUI generator 600 storing the prompt object "y" VUI data structure in the application VUI data repository or portion 646 (block 854). For example, prompt object data structure generator 612 writes the prompt object "y" VUI data structure to a created portion 646 within the application, enabling the application with VUI modality.

Method 840 may continue with the VUI generator 600 determining that the prompt object rank "y" is the last prompt object in flow path "x" (block 856). If the prompt object rank "y" is not the last prompt object in flow path "x", the variable "y" is incremented (block 858) and method 840 returns to block 848 to analyze the next prompt object in the same flow path.

If the prompt object rank "y" is the last prompt object in flow path "x", method 800 may continue with VUI generator 600 determining whether the flow path rank "x" is the last flow path in the flow path data structure 480 (block 860). If the flow path rank "x" is the last flow path in the flow path data structure 480, method 840 ends at block 866. If the flow path rank "x" is not the last flow path in the flow path data structure 480, variable "x" is incremented (block 862) and variable "y" is reset back to 1 (block 864) in order to generate a VUI data structure for the highest ranked prompt object within the next ranked flow path. Method 840 then returns to block 848.

Figure 20:
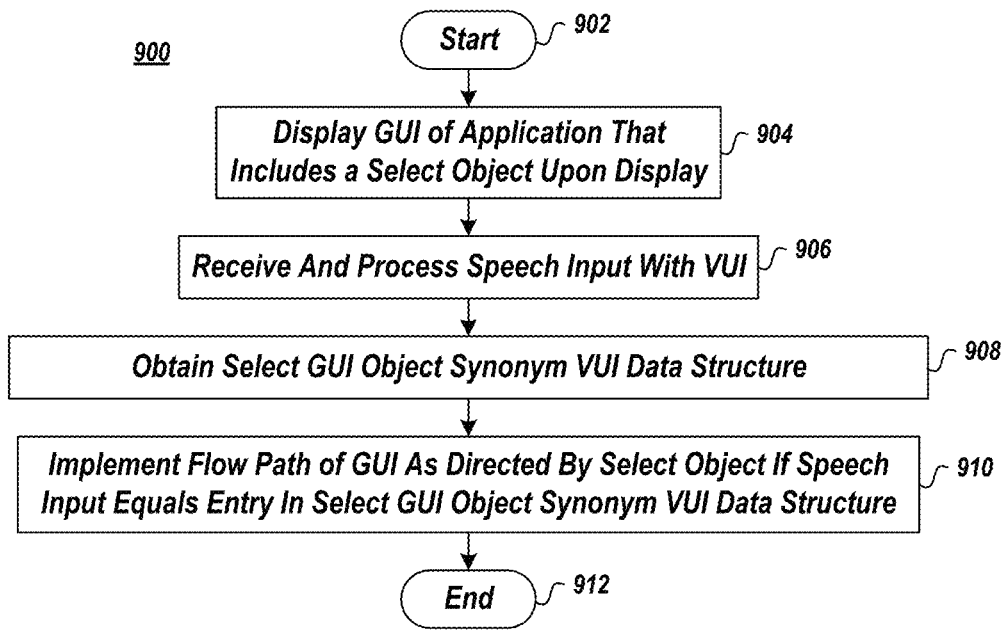
FIG. 20 illustrates a method of presenting a VUI utilizing the select object synonym VUI data structure and implementing the flow path of GUI screens as directed by the select GUI object utilizing the VUI, according to one or more embodiments.

FIG. 20 illustrates a method 900 of presenting a VUI utilizing the select object synonym VUI data structure and implementing the flow path of GUI screens as directed by the select object utilizing the VUI, according to one or more embodiments. Method 900 may be utilized by application user computing system 100 to evoke the application 602 that includes a GUI and VUI modality that was provided by the parser 400, natural language processing system 500, and VUI generator 600 as described herein. Method 900 begins at block 902 and continues with computing system 100 displaying a GUI of application 602 upon display 152 such that the GUI includes a select object displayed therein (block 904).

Method 900 may continue with the computing system 100 receiving and processing speech input 651 with the VUI modality (block 906). For example, voice input 651 from a user 650 is received by microphone 156 of system 100. System 100 subsequently analyzes the voice input 651 (e.g., converts the speech input 651 to text, or the like) and determines to which select object that is displayed upon the GUI is associated with the voice input 651.

Method 900 may continue with computing system 100 obtaining the select object VUI data structure that is associated with the determined select object (block 908). Computing system 100 may obtain the appropriate select object VUI data structure from VUI directory or portion 646, and analyze the voice input 651 against the select object VUI data structure to determine whether the voice input 651 equals the text of the select object or whether the voice input 651 equals a synonym of the text of the select object. If the application 602 determines that the voice input does equals the text of the select object or does equal a synonym of the text of the select object, the application 602 begins or continues the flow path associated with the select object that is displayed within the GUI of application 602 (block 910). Method 900 ends at block 912.

Figure 21:
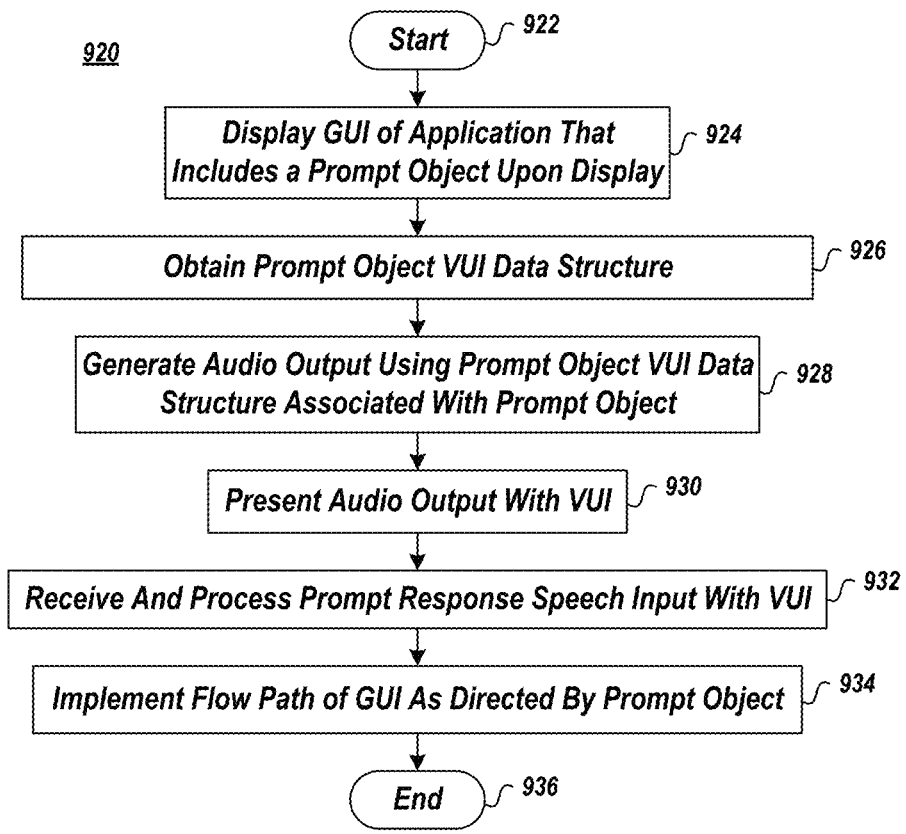
FIG. 21 illustrates a method of presenting a VUI utilizing the prompt object VUI data structure and implementing the flow path of GUI screens as directed by the prompt GUI object utilizing the VUI, according to one or more embodiments.

FIG. 21 illustrates a method 920 of presenting a VUI utilizing the prompt object VUI data structure and implementing the flow path of GUI screens as directed by the prompt object utilizing the VUI, according to one or more embodiments. Method 920 may be utilized by application user computing system 100 to evoke the application 602 that includes a GUI and VUI modality that was provided by the parser 400, natural language processing system 500, and VUI generator 600 as described herein. Method 920 begins at block 922 and continues with computing system 100 displaying a GUI of application 602 upon display 152 such that the GUI includes a prompt object displayed therein (block 924).

Method 900 may continue with the computing system 100 obtaining the prompt object VUI data structure that is associated with the displayed prompt object (block 926). For example, application 602 may identify the prompt object VUI data structure from within VUI directory or portion 646 and read the prompt object VUI data structure.

Method 900 may continue with computing system 100 generating audio output 652 utilizing the prompt object VUI data structure (block 928). For example, the VUI reads the prompt object VUI data structure, determines the text associated with the prompt of the prompt objects, and generates the prompt associated with the prompt object as an audio output 652 upon speaker 154. Method 900 may continue with the VUI of computing system 100 presenting the generated audio output 652 upon speaker 154 of computing system 100 (block 930).

Method 900 may continue with receiving voice input 651 prompt response with the VUI of computing system 100 (block 932). For example, voice input 651 from a user 650 is received by microphone 156 of system 100 as a response to the audio prompt of block 930. System 100 subsequently analyzes the voice input 651 (e.g., converts the speech input 651 to characters, or the like) and utilizes the characters as an associated input within application 602.

Method 900 may continue with the application 602 determining that the voice input 651 prompt response is a valid input for the prompt object and the application 602 begins or continues the flow path associated with the prompt object that is displayed within the GUI of application 602 (block 934). Method 920 ends at block 936.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method, comprising:
   receiving application data of an application that is under development from an application developer computing system;
   aggregating static images of a graphical user interface of the application (GUI screens) that are contained within the application data;
   analyzing each GUI screen to determine GUI screen navigational flow paths (flow paths);
   generating a flow path data structure comprising a list of the flow paths ranked by the number of edge objects comprised within the flow paths and comprising a list of edge objects within the flow paths ranked by the number of dependent edge objects;
   identifying a first edge object within the flow path data structure as a select object;
   determining a word or phrase associated with the select object from characters that are displayed by the select object with a natural language processing system;
   determining synonyms to the word or phrase with the natural language processing system;
   generating a select object synonym data structure comprising the word or phrase and the synonyms to the word or phrase associated with the select object;
   creating a voice user interface (VUI) select object data structure from the select object synonym data structure;
   sending the VUI select object data structure to the application developer computing system to create an application with VW modality; and
   wherein a first GUI screen navigational flow path is a first navigational sequence of GUI screens associated with a first set of user interactions with the GUI screens and a second GUI screen navigational flow path is a second navigational sequence of GUI screens associated with a second set of user interactions with the GUI screens.

2. The method of claim wherein the select object is a GUI object that begins or continues an associated GUI screen flow path upon the selection of the GUI object.

3. The method of claim 1, wherein the GUI screens are aggregated screenshots of the application under development that is evoked by the application developer computing system.

4. The method of claim 1, wherein the GUI screens are aggregated from an executable file of the application under development.

5. The method of claim wherein the GUI screens are aggregated from mockup images of the application under development.

6. The method of claim 1, wherein the GUI screens are aggregated from storyboard images of the application under development.

7. The method of claim 1, wherein the flow path data structure further comprises an edge object identified as a fork object that belongs to multiple flow paths.

8. The method of claim 1, wherein the first set of user interactions are a first order of simulated user manipulation sequences of a first collection of edge objects within the GUI screens, wherein the second set of user interactions are a second order of simulated user manipulation sequences of a second collection of edge objects within the GUI screens, and wherein a same edge object is comprised within the first collection of edge objects and within the second collection of edge objects.

9. A computer program product comprising a computer readable storage medium having program instructions embodied therewith, the program instructions readable by a service computing system to cause the service computing system to:
  receive application data of an application that is under development from an application developer computing system;
  aggregate static images of a graphical user interface of the application (GUI screens) that are contained within the application data;
  analyze each GUI screen to determine GUI screen navigational flow paths (flow paths);
  generate a flow path data structure comprising a list of the flow paths ranked by the number of edge objects comprised within the flow paths and comprising a list of edge objects within the flow paths ranked by the number of dependent edge objects;
  identify a first edge object within the flow path data structure as a select object; determine a word or phrase associated with the select object from characters that are displayed by the select object with a natural language processing system;
  determine synonyms to the word or phrase with the natural language processing system;
  generate a select object synonym data structure comprising the word or phrase and the synonyms to the word or phrase associated with the select object;
  create a voice user interface (VUI) select object data structure from the select object synonym data structure;
  send the VUI select object data structure to the application developer computing system to create an application with VUI modality; and
  wherein a first GUI screen navigational flow path is a first navigational sequence of GUI screens associated with a first set of user interactions with the GUI screens and a second GUI screen navigational flow path is a second navigational sequence of GUI screens associated with a second set of user interactions with the GUI screens.

10. The computer program product of claim 9, wherein the select object is a GUI object that begins or continues an associated GUI screen flow path upon the selection of the GUI object.

11. The computer program product of claim 9, wherein the GUI screens are aggregated screenshots of the application under development that is evoked by the application developer computing system.

12. The computer program product of claim 9, wherein the GUI screens are aggregated from an executable file of the application under development.

13. The computer program product of claim 9, wherein the GUI screens are aggregated from mockup images of the application under development.

14. The computer program product of claim wherein the GUI screens are aggregated from storyboard images of the application under development.

15. The computer program product of claim 9, wherein the flow path data structure further comprises an edge object identified as a fork object that belongs to multiple flow paths.

16. The computer program product of claim 9, wherein the first set of user interactions are a first order of simulated user manipulation sequences of a first collection of edge objects within the GUI screens, wherein the second set of user interactions are a second order of simulated user manipulation sequences of a second collection of edge objects within the GUI screens, and wherein a same edge object is comprised within the first collection of edge objects and within the second collection of edge objects.

* * * * *